(12) United States Patent
Nuggehalli et al.

(10) Patent No.: US 10,425,548 B2
(45) Date of Patent: *Sep. 24, 2019

(54) SYSTEM FOR MODIFYING A SET OF APPLICATION SERVICES ON MULTI-FUNCTION PRINT DEVICES

(71) Applicants: Jayasimha Nuggehalli, Cupertino, CA (US); Bhushan Nadkarni, Santa Clara, CA (US); Srikrishan Narasimhan, Sunnyvale, CA (US); Zhenyu Lu, Sunnyvale, CA (US)

(72) Inventors: Jayasimha Nuggehalli, Cupertino, CA (US); Bhushan Nadkarni, Santa Clara, CA (US); Srikrishan Narasimhan, Sunnyvale, CA (US); Zhenyu Lu, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/400,862

(22) Filed: Jan. 6, 2017

(65) Prior Publication Data

US 2018/0198941 A1 Jul. 12, 2018

(51) Int. Cl.
*H04N 1/00* (2006.01)
*H04N 1/32* (2006.01)
*H04L 29/08* (2006.01)

(52) U.S. Cl.
CPC ......... *H04N 1/00973* (2013.01); *H04L 67/36* (2013.01); *H04N 1/00204* (2013.01);
(Continued)

(58) Field of Classification Search
None
See application file for complete search history.

(56) References Cited

U.S. PATENT DOCUMENTS

2002/0091547 A1* 7/2002 Ohe ................. G06F 8/65
705/2
2002/0159807 A1* 10/2002 Ishida ............. G06Q 10/087
400/76
(Continued)

FOREIGN PATENT DOCUMENTS

JP 2005-24594 1/2005
JP 2006-185191 7/2006
(Continued)

OTHER PUBLICATIONS

Nuggehalli, U.S. Appl. No. 15/400,843, filed Jan. 6, 2017, Interview Summary, dated Dec. 22, 2017.
(Continued)

*Primary Examiner* — Fan Zhang
(74) *Attorney, Agent, or Firm* — Hickman Palermo Becker Bingham LLP; Edward A. Becker

(57) ABSTRACT

A multi-function print server administration service implemented on a server computer receives a request, by a user associated with either a vendor-administrator user account or a system administrator account, to modify a first set of one or more application services enabled on one or more multi-function print devices associated with the vendor-administrator user account. In response to receiving the requests, the multi-function print server generates a modified first set of one or more application services, which implements a modification to the one or more application services based on the received request to modify the first set of one or more application services. The multi-function print server administration service enables the modified first set of one or more application services on the one or more multi-function print devices.

20 Claims, 13 Drawing Sheets

(52) U.S. Cl.
CPC ..... *H04N 1/00344* (2013.01); *H04N 1/00347* (2013.01); *H04N 1/00925* (2013.01); *H04N 1/00938* (2013.01); *H04N 1/32523* (2013.01); *H04N 2201/0094* (2013.01)

(56) References Cited

U.S. PATENT DOCUMENTS

| | | | |
|---|---|---|---|
| 2008/0144087 A1* | 6/2008 | Mitsui | G06F 3/1204 358/1.15 |
| 2009/0165005 A1 | 6/2009 | Hagiuda | |
| 2013/0135668 A1* | 5/2013 | Minagawa | G06F 3/1204 358/1.15 |
| 2013/0135675 A1 | 5/2013 | Hashimoto | |
| 2013/0208303 A1 | 8/2013 | Uchida | |
| 2014/0078541 A1* | 3/2014 | Takano | G06F 3/1203 358/1.14 |
| 2015/0334253 A1* | 11/2015 | Kakii | H04N 1/44 358/1.14 |
| 2016/0226952 A1 | 8/2016 | Hong | |
| 2016/0373460 A1* | 12/2016 | Itoh | H04L 63/105 |
| 2017/0289381 A1* | 10/2017 | Kawai | H04N 1/00066 |
| 2018/0198947 A1 | 7/2018 | Nuggehalli | |
| 2018/0240116 A1 | 8/2018 | Nuggehalli | |

FOREIGN PATENT DOCUMENTS

| | | |
|---|---|---|
| JP | 4645833 B2 | 3/2011 |
| JP | 2014-2786 A | 1/2014 |

OTHER PUBLICATIONS

Nuggehalli, U.S. Appl. No. 15/400,862, filed Jan. 6, 2017, Office Action, dated Oct. 4, 2017.

Nuggehalli, U.S. Appl. No. 15/400,843, filed Jan. 6, 2017, Office Action, dated Oct. 4, 2017.

Nuggehalli, U.S. Appl. No. 15/400,843, filed Jan. 6, 2017, Notice of Allowance, dated Apr. 23, 2018.

Nuggehalli, U.S. Appl. No. 15/400,843, filed Jan. 6, 2017, Interview Summary, dated Apr. 5, 2018.

Japan Patent Office, "Search Report" in application No. PCT/JP2017/045195, dated Mar. 6, 2018, 9 pages.

* cited by examiner

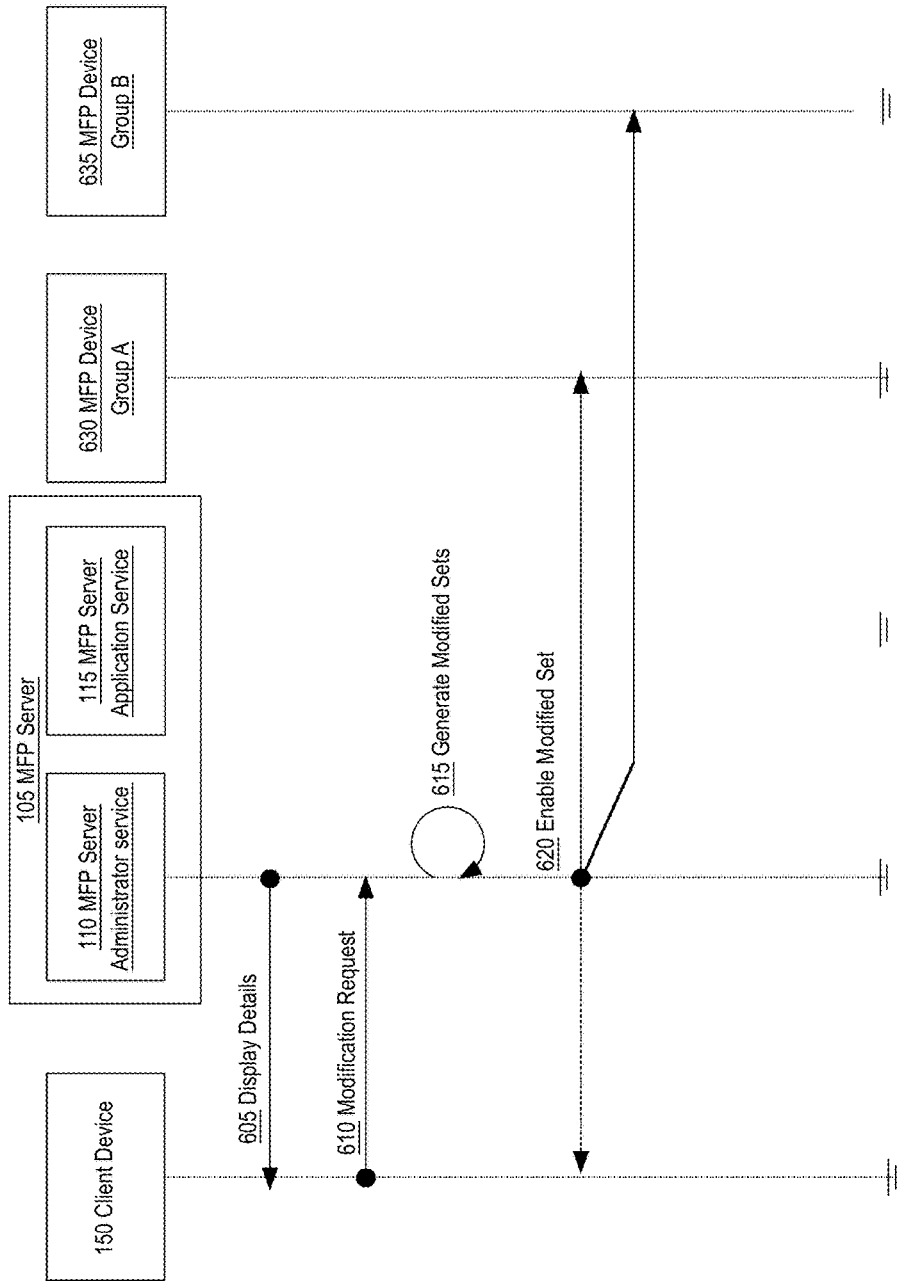

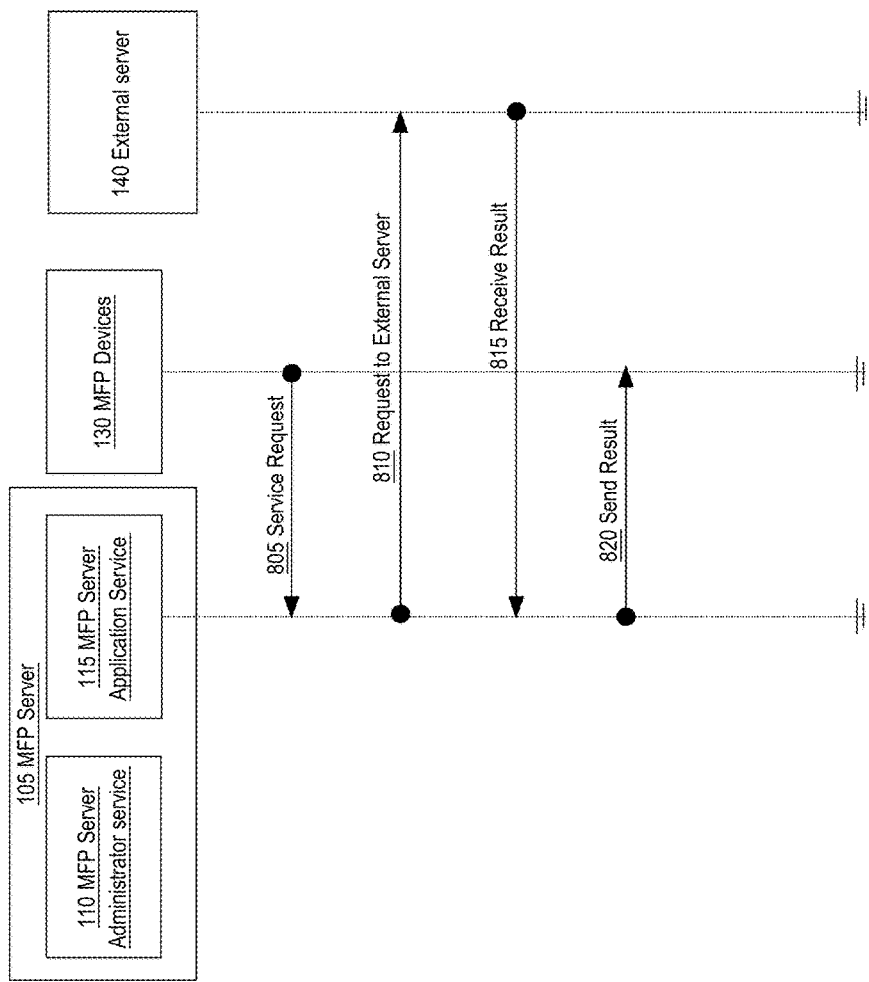

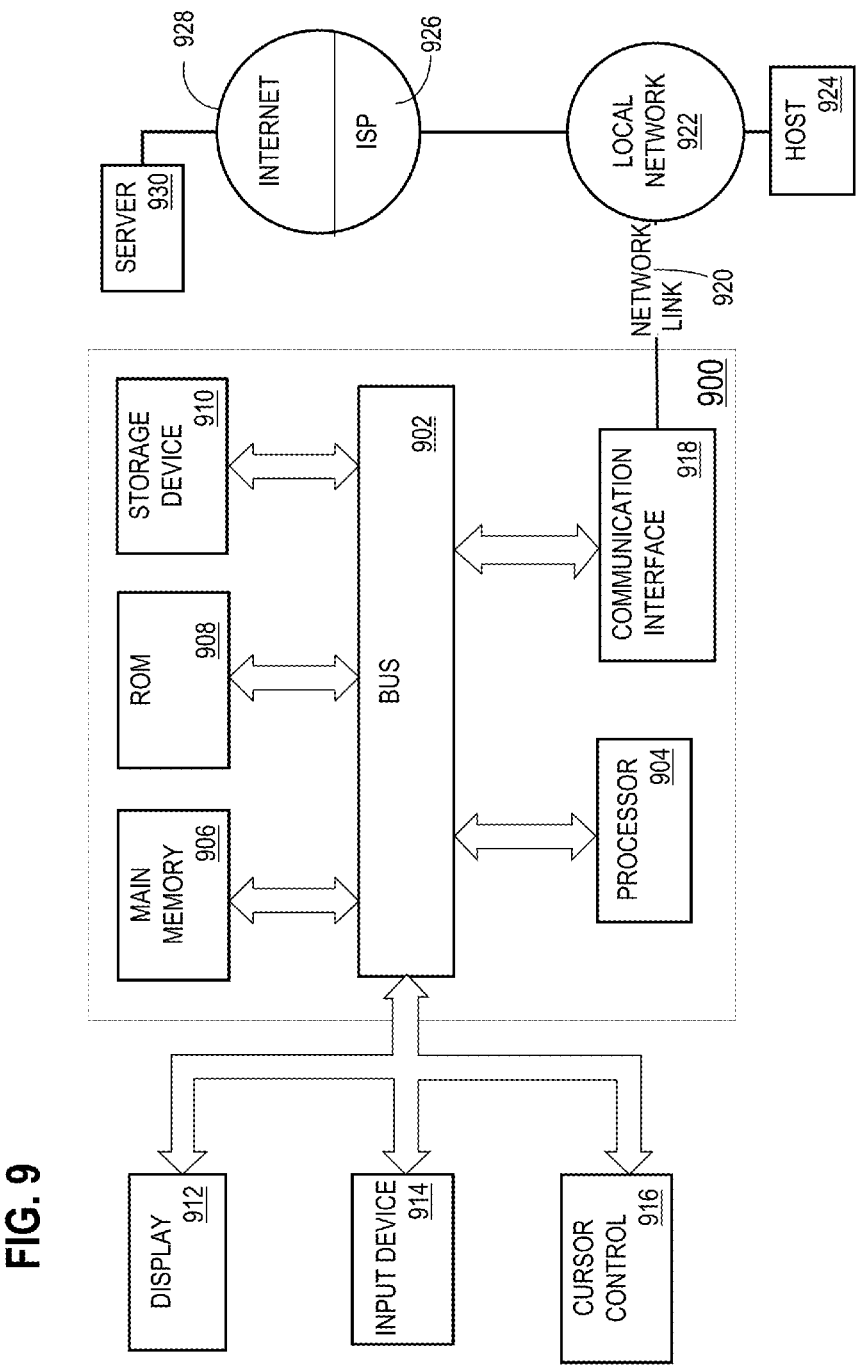

SYSTEM FOR MODIFYING A SET OF APPLICATION SERVICES ON MULTI-FUNCTION PRINT DEVICES

RELATED APPLICATION DATA AND CLAIM OF PRIORITY

This application is related to U.S. patent application Ser. No. 15/400,843 entitled System for MODIFYING A SET OF APPLICATION SERVICES ON MULTI-FUNCTION PRINT DEVICES, filed Jan. 6, 2017, the contents all of which are incorporated by reference in their entirety for all purposes as if fully set forth herein.

FIELD OF THE INVENTION

Embodiments relate generally to modifying a set of application services implemented on multiple multi-function print devices. SUGGESTED GROUP ART UNIT: 2184; SUGGESTED CLASSIFICATION: 710.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Managing services on distributed multi-function print devices includes the ability to configure different application services on multiple devices located in different locations. Among the many challenges involved in managing multiple devices over different locations is the ability to seamlessly configure multiple multi-function print devices without the need to manually configure each multi-function print device when changes are necessary.

One such technique for remotely managing services on multiple devices is to remotely connect to each device and, when connected, implement the desired change. However, this approach may become lengthy, as it requires manually connecting to each device separately. Additionally, this approach may lead to instances where the distributed devices are out of sync with each other, because during the process of manually connecting to each device, some devices may be configured with the new changes, while other devices may still be running using the original set up.

A technique for efficiently updating configurations on multiple remote multi-function print devices is desired.

SUMMARY

An apparatus includes one or more processors, one or more memories communicatively coupled to the one or more processors and a multi-function print server administration service executing on the apparatus. The multi-function print server administration service receives a request, by a user associated with a system administrator user account, to modify one or more application services in two or more sets of application services associated with two or more vendor accounts. In response to receiving the request, the multi-function print server generates two or more modified sets of one or more application services, each of which implements a modification to the one or more application services in the two or more sets of application services based on the received request to modify the one or more application services in the two or more sets of application services. The multi-function print server administration service enables the two or more modified sets of application services on two or more sets of multi-function print devices, where each set of multi-function print devices is associated with a vendor account of the two or more vendor accounts.

BRIEF DESCRIPTION OF THE DRAWINGS

In the figures of the accompanying drawings like reference numerals refer to similar elements.

FIG. 6 is a flow diagram of a method for modifying the availability of one or more application services in multiple sets of application services implemented on MFP devices.

FIG. 8 is a flow diagram of a method for a MFP server application service receiving and processing service requests from MFP devices.

FIG. 9 is a block diagram that depicts an example computer system upon which embodiments may be implemented.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in flow diagram form in order to avoid unnecessarily obscuring the embodiments.

1. OVERVIEW
2. STRUCTURAL OVERVIEW
3. APPLICATION CATEGORIES
4. MFP SERVER ADMINISTRATION SERVICE
  4.1. VENDOR-ADMINISTRATOR
    4.1.1. DISABLE APPLICATION SERVICE(S)
    4.1.2. ENABLE APPLICATION SERVICE(S)
    4.1.3. MODIFY ARRANGEMENT OF APPLICATION SERVICES
  4.2. SYSTEM ADMINISTRATOR
    4.2.1 SYSTEM ADMINISTRATOR MODIFICATION REQUESTS
    4.2.2. ENABLE/DISABLE APPLICATION SERVICES
5. MFP SERVER ADMINISTRATION SERVICE
6. IMPLEMENTATION MECHANISMS

1. Overview

A multi-function print server administration service implemented on a server computer receives a request, by a user associated with either a vendor-administrator user account or a system administrator account, to modify a first set of one or more application services enabled on one or more multi-function print devices associated with the vendor-administrator user account. In response to receiving the requests, the multi-function print server generates a modified first set of one or more application services, which implements a modification to the one or more application services based on the received request to modify the first set of one or more application services. The multi-function print server administration service enables the modified first set of one or more application services on the one or more multi-function print devices.

2. Structural Overview

Figure 1:
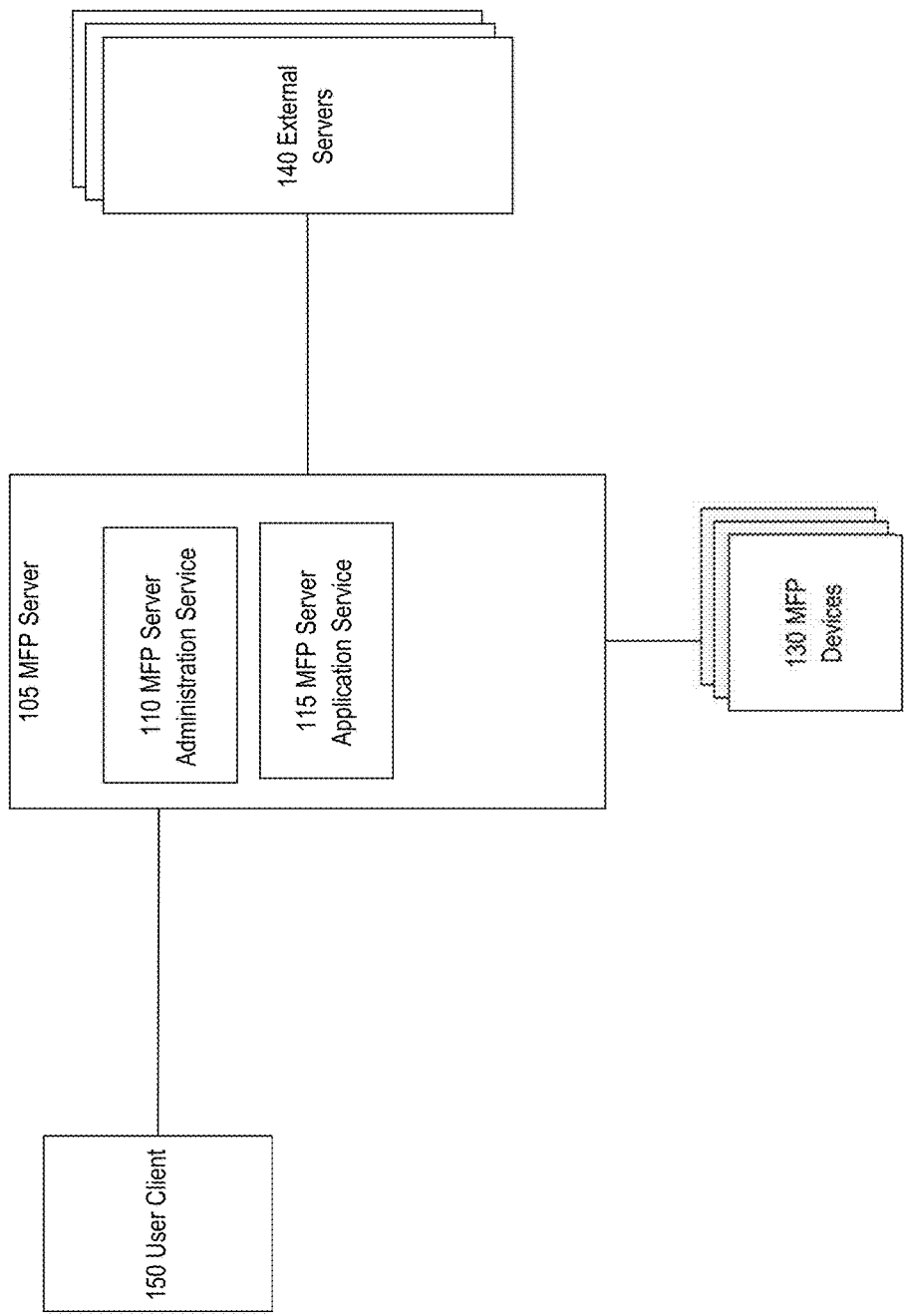
FIG. 1 is a flow diagram that depicts an arrangement for classifying and routing input requests to a destination.

FIG. 1 is a flow diagram that depicts an arrangement for modifying sets of application services available on multiple multi-function print (MFP) devices. FIG. 1 includes a user client 150, an MFP server 105, MFP server administrative service 110, MFP server application service 115, external servers 140, and MFP devices 130. The user client 150, MFP server 105, MFP server administrative service 110, MFP server application service 115, external servers 140, and MFP devices 130 may be communicatively coupled via one or more networks including, for example one or more wired or wireless networks, such as local area networks (LANs), wide area networks (WANs), the Internet, as well as one or more direct connections. In addition, although the elements of FIG. 1 are depicted and described herein in one particular configuration, this is done for explanation purposes only and the elements of FIG. 1 may be configured in any manner. For example, the MFP server 105 may represent two or more separate data servers, communicatively coupled via one or more networks, that each host and manage the MFP server administration service 110 and the MFP server application service 115 respectively. Additionally, the MFP server 105 may be implemented within a cloud environment where elements of the MFP server 105 are running on multiple servers within the cloud environment. FIG. 1 is not limited to the particular elements displayed and may include fewer or additional elements depending upon a particular implementation.

In an embodiment, user client 150 may represent a computing device from which a user may communicate with the MFP server 105 using a specific user account. Types of user accounts may include, but are not limited to, a vendor-administrator user account, a system administrator user account, or any other authorized user account. A vendor-administrator user account is a user account associated with a particular vendor that owns, leases, or manages different MFP devices. The vendor-administrator user account allows a specific vendor to manage different aspects of their MFP devices including, but not limited to, pricing for the available services, authorized customers of the MFP devices, configure payment services and payment routing, enabling and disabling different application services on the MFP devices, and adjusting the display order of available application services displayed on the MFP devices. The system administrator user account is a user account configured to grant system administrators access to manage different vendors, the application services available to the vendors, the list of linked MFP devices, and activity logs associated with specific vendors and/or specific MFP devices.

In an embodiment, user client 150 may be configured to communicate user requests to the MFP server 105. A user request may be defined as either a request for information or a request to update configurations of vendor specific services and/or MFP specific configurations. In an embodiment, user requests that specify requests for information may include, but are not limited to, a query for a current configuration of enabled application services, available applications, or any other query of user, MFP devices, or application services configured for a specific vendor or multiple vendors. In an embodiment, user requests that specify configuration updates may include, but are not limited to, an update request to add, delete, or update: a list of vendors, customers, MFP devices, enabled application services, or categories of application service types. Categories of application service types may represent groups of application services that are grouped together based upon the type of service offered. For example, one category may represent enabled application services related to scanning documents, while another category may represent enabled application services related to making copies of documents, and yet another category may represent enabled application services related to printing documents. In an embodiment, types of categories may be modified, deleted, or new categories may be created.

In an embodiment, the MFP server 105 is configured to receive user requests related to managing configurations of MFP devices 130, receive application requests originating from MFP devices 130, and communicate application requests to external servers 140. FIG. 1 depicts an embodiment of the MFP server 105. The MFP server 105 is implemented using one or more computer programs or other software elements that are loaded into and executed using one or more general-purpose computers, or logic implemented in field programmable gate arrays (FPGAs) of application-specific integrated circuits (ASICs). The MFP server 105 includes the MFP server administration service 110 and the MFP server application service 115.

In an embodiment, the MFP server administration service 110 is implemented using one or more programs executing on one or more computers within the MFP server 105. The MFP server administration service 110 is configured or programmed to receive a user request from the user client 150 and modify the application service configurations based on the user request received. For example, if the user request specifies adding application services to the set of enabled application services, then the MFP server administration service 110 is configured to generate a modified set of enabled application services that include the new application services specified in the user request. In another example, if the user request specifies removing multiple MFP devices from the list of active MFP devices for a specific vendor user, then the MFP server administration service 110 is configured to generate a modified list of active MFP devices that does not include the MFP devices identified in the user request.

In an embodiment, MFP server administration service 110 is further configured or programmed to send the modified configurations to the target MFP devices. For example, if the received user request is a modification request for the currently enabled application services for a particular vendor user, then the MFP server administration service 110 modifies the currently enabled application services to generate a modified set of application services and then sends the modified set of application services to the MFP devices 130 associated with the particular vendor user.

In an embodiment, the MFP server application service 115 is implemented using one or more programs executing on one or more computers within the MFP server 105. The MFP server application service 115 is configured or programmed to receive application service requests, from an MFP device, format, and forward the received application service request to the external servers 140.

External servers 140 represents an example of multiple external application servers configured or programmed to receive and perform application specific requests. The multiple application servers represented by external servers 140 may include, but are not limited to, externally hosted email servers, a Dropbox™ server, a Box™ server, a Google Drive™ server, an Office365™ external application server, or any other externally managed application service. In an embodiment, the external servers 140 may be configured to communicate data such as result sets or acknowledgement messages to the MFP server 105 based on the type of application request. For example, if the application request is a scan and save into a specific Dropbox account, then the external Dropbox server may be configured to send an acknowledgement message indicating whether the document has been successfully saved in a customer's Dropbox folder to the MFP server 105. The MFP server 105 then may send the acknowledgement back to the specific MFP device so that the customer may be informed that the save to Dropbox was successful.

FIG. 1 also depicts MFP devices 130, which represent different types of multi-function print devices including, but not limited to, small office or home office printers, larger commercial copy printers, portable multi-function print devices, or any other print device that is capable to communicating to the MFP server using a network connection. In an embodiment, the MFP devices 130 are equipped with a graphical user interface screen that allow a specific customer to enter commands and credential information that may be used to generate application service requests.

3. Application Categories

In an embodiment, application service categories are used to group application services for the purpose of organizing the application services for users of MFP devices 130. For example, if multiple application services provide scanning capabilities, then those application services may be grouped together so that a user may be able to efficiently identify the available application services that provide scanning capabilities.

In an embodiment, application service categories may be further organized using sub-categories that may be used to create a higher level of granularity between different application services within a larger group. For example, the scan category may also include multiple sub-categories such as cloud-storage scanning and email scanning. The cloud-storage scanning category may contain application services that have the capability of scanning a document using the MFP device 130 and storing the scanned document within cloud storage. The email scanning category may contain application services that have the capability of scanning a document using the MFP device 130 and attaching the scanned document to a particular email service.

In an embodiment, application services within categories and sub-categories may maintain hierarchal inheritance properties. Hierarchal inheritance properties allow specific application services that belong to particular sub-categories to inherit properties from the parent categories. For example, if the Dropbox service belongs to the particular cloud-storage scanning category, then the Dropbox service also belongs to the parent scan category. If a system administrator edits or deletes the particular cloud-storage scanning category, then the Dropbox service may automatically be associated with the parent scan category. This inheritance allows the system administrator the flexibility to efficiently delete or modify sub-categories without worrying about inadvertently disabling application services associated with a deleted sub-category.

In an embodiment, categories and sub-categories for application services may be configured to be vendor account specific. The system administrator may configure the sets of application services within categories to be specific to the specific vendor. For instance, the system administrator may configure a scan category specific to vendor-A to contain a cloud-storage sub-category which contains application services such as Dropbox and Google Drive and configure a scan category specific to vendor-B to contain a free-storage sub-category that may contain Google Drive but not Dropbox. In another embodiment, vendor-administrators may have the capability to add and delete specific categories and sub-categories.

4. Server Administration Service

Figure 2:
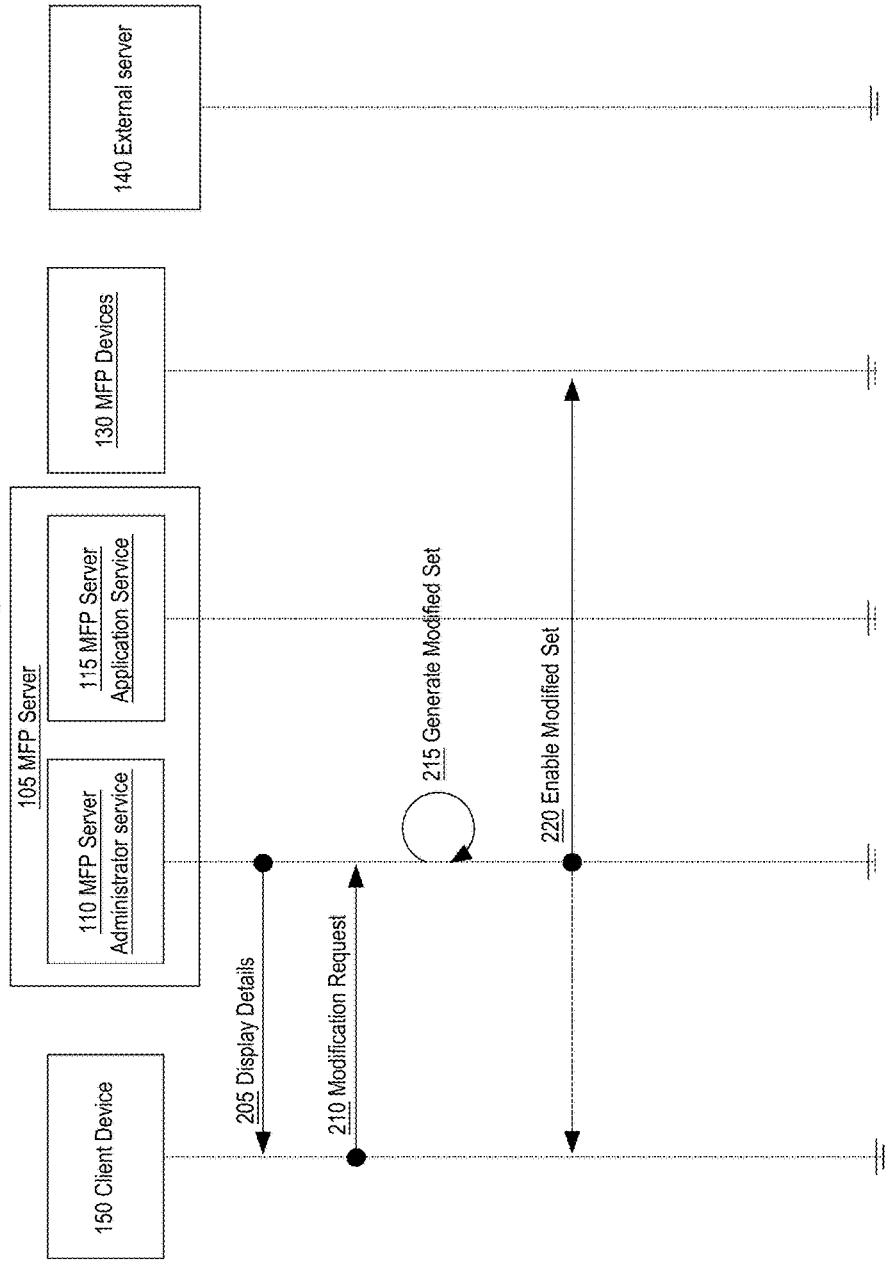
FIG. 2 is a flow diagram that depicts an example method for modifying a set of application services implemented on MFP devices based upon a user request.

FIG. 2 is a flow diagram that depicts an example method for modifying a set of application services implemented on MFP devices based upon a user request. FIG. 2 contains user client 150, MFP server administration service 110, MFP server application service 115, MFP devices 130, and external servers 140. MFP server administration service 110 and MFP server application service 115 are depicted as implemented on MFP server 105. The various systems of FIG. 2 may interact over a network shown in FIG. 1.

Specifically, FIG. 2 depicts steps to modify the set of application services based on receiving a user request generated by a vendor-administrator. In an embodiment, a vendor-administrator may use a vendor-administrator account to log into the MFP server administration service 110 for the purpose of updating configurations of MFP devices 130 associated with the vendor-administrator account. For example, vendor-A may use user client 150 to send a login request to the MFP server administration service 110. Once logged in, vendor-A may select a specific vendor configuration to view for adjustment purposes, such as the set of application services related to scanning documents.

Figure 3:
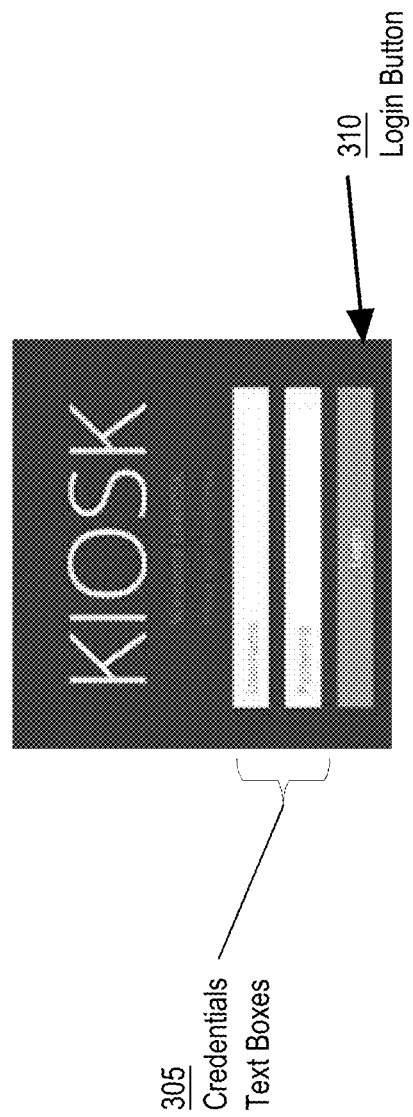
FIG. 3 is an example embodiment of an MFP server administration service login window.

FIG. 3 depicts an example embodiment of the MFP server administration service 110 login window. Credentials text boxes 305 are text fields where a user may enter his login and password. Login button 310 illustrates an action button for sending the user's login credentials to the MFP server administration service 110. In an embodiment, the login window allows different types of users to log into the MFP server administration service 110 such as vendor-administrators, system administrators, or any other user. For example, if the user logs in using a vendor-administrator account, then the MFP server administration service 110 may present the user with options specific to the vendor-administrator. If however, the user logs into the MFP server administration service 110 with a system administrator account then the MFP server administration service 110 may present the user with system administrator specific views for configuring the MFP devices and the vendor views.

4.1. Vendor-Administrator

Figure 4:
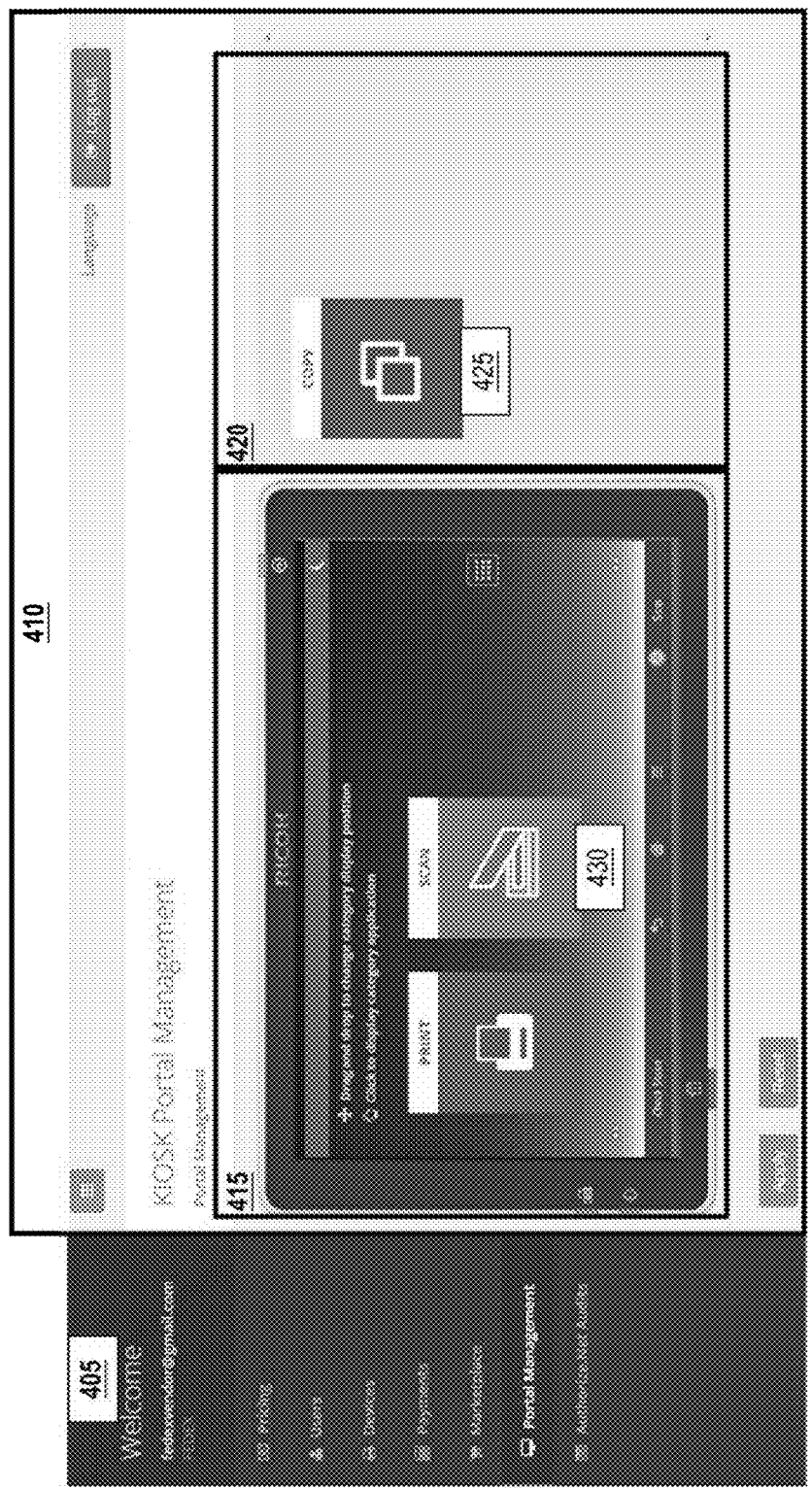
FIGS. 4A through 4D are example embodiments of display screens displaying configuration options of application services and categories.

Step 205 depicts an embodiment of the MFP server administration service 110 displaying configuration details specific to a vendor-administrator account. In one embodiment, the MFP server administration service 110 displays configuration details showing application services enabled on MFP devices 130 associated with the vendor-administrator account. FIG. 4A depicts an example embodiment of a display screen displaying a configuration of application services organized into categories based on function type. In an embodiment, a display screen is communicatively coupled to user client 150. In FIG. 4A, navigation pane 405 contains navigation links that allow the vendor-administrator to navigate between different configuration options. In an embodiment, the vendor-administrator may view and modify configuration options related to pricing of services, authorized customers based on user accounts, available payment options, subscriptions of available application services, and enabling application services and the display of the enabled application services to customers.

In an embodiment, vendor application management view 410 represents a vendor-administrator view of a virtual MFP device screen and a management workspace. The virtual MFP display 415 represents the display of application categories as it is currently presented on MFP devices 130. The virtual MFP display 415 allows the vendor-administrator to view the application and category screens as a customer and allows the vendor-administrator to modify the application and category screens if required. Workspace 420 is a vendor specific space where application services and application categories available to specific vendors that have not yet been enabled are viewable. For example, copy category icon 425 represents a category for application services related to copy functions. The copy category icon 425 is available to the vendor-administrator but, has not yet been enabled. Vendors may choose to subscribe to various application services for the purpose of enabling application services on MFP devices 130. In order for a specific vendor-administrator to enable an application service, the vendor-administrator must first subscribe to the application service. Once subscribed to the application service, the application service will be visible within the workspace 420. Then the vendor-administrator may enable an application by moving the application service from the workspace 420 to the virtual MFP display 415 for a particular category in order to enable the application service within that particular category. The subscription feature allows vendor-administrators the ability to customize available application service content within the workspace 420 and the virtual MFP display 415 for the purpose of managing which application services are enabled and which application services are disabled for customers. By maintaining a separate layer of subscribed application services, vendor-administrators are not overwhelmed by the total number of existing application services on the MFP server 105 and are able to focus on a subset of subscribed application services that are specific to the particular vendor's needs.

Figure 4B:
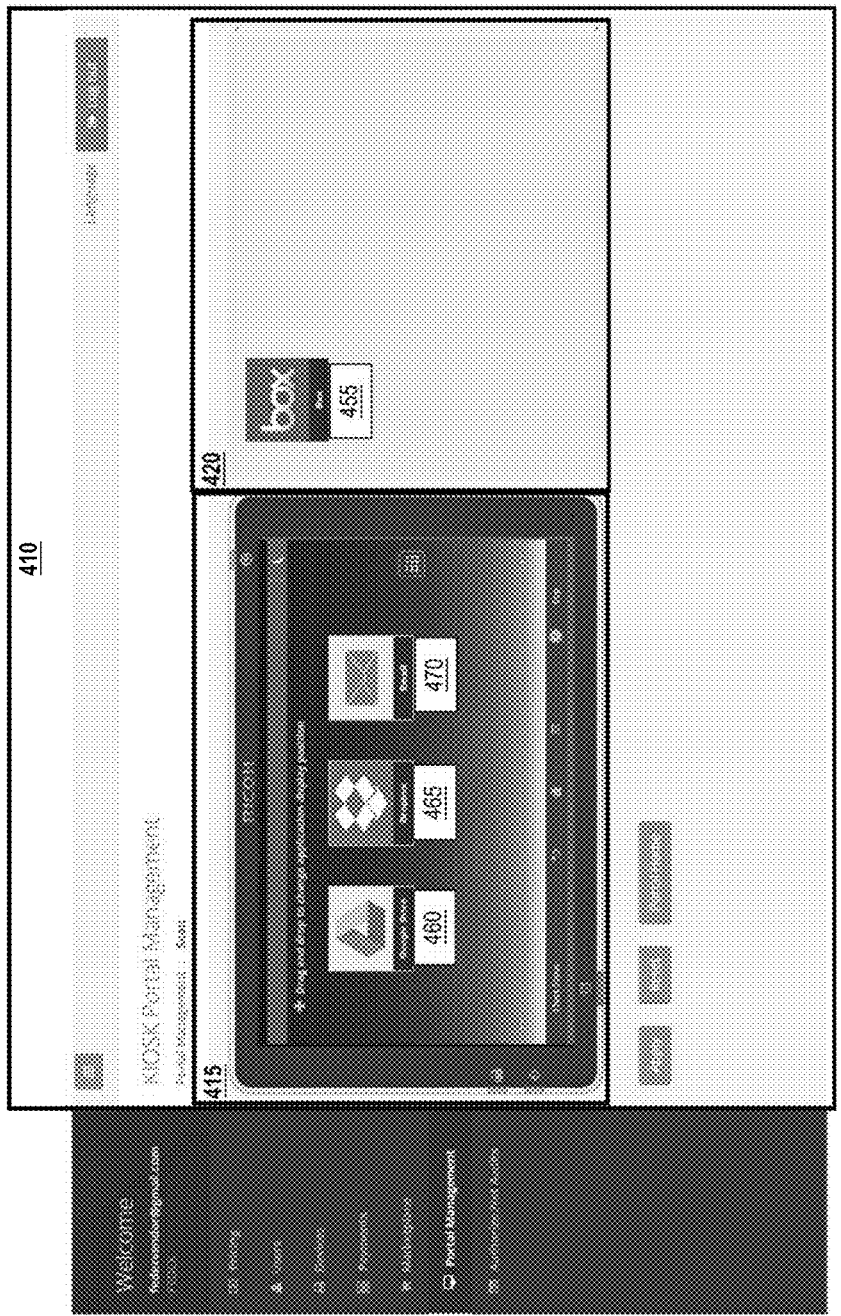

In an embodiment, the MFP server administration service 110 may display configuration options for application services within a specific category. If the vendor-administrator clicks on a particular category within the virtual MFP display 415, then the MFP server administration service 110 may display enabled application services within that particular category selected. FIG. 4B depicts an example display showing enabled application services within a particular category, in this example, the scan category. Virtual MFP display 415 displays the currently enabled applications for the scan category within the vendor application management view 410. Workspace 420 now contains available application services for the scan category that are not currently enabled in the virtual MFP display 415.

Other embodiments of vendor configuration display may include, but are not limited to, a service pricing display, current customers display, enabled MFP devices display, and payment options display. Each of the vendor configuration displays, when selected from the navigation pane 405, are displayed within the vendor management view 410.

At step 210 a modification request is received by the MFP server administration service 110 from the vendor-administrator using user client 150. In an embodiment, a vendor-administrator, using user client 150, may generate a modification request based upon the displayed configuration options. Embodiments, of a modification request may include, but are not limited to a request to enable one or more application services, a request to disable one or more application services, or a request to change the arrangement order of application services.

4.1.1. Disable Application Service

Figure 4C:
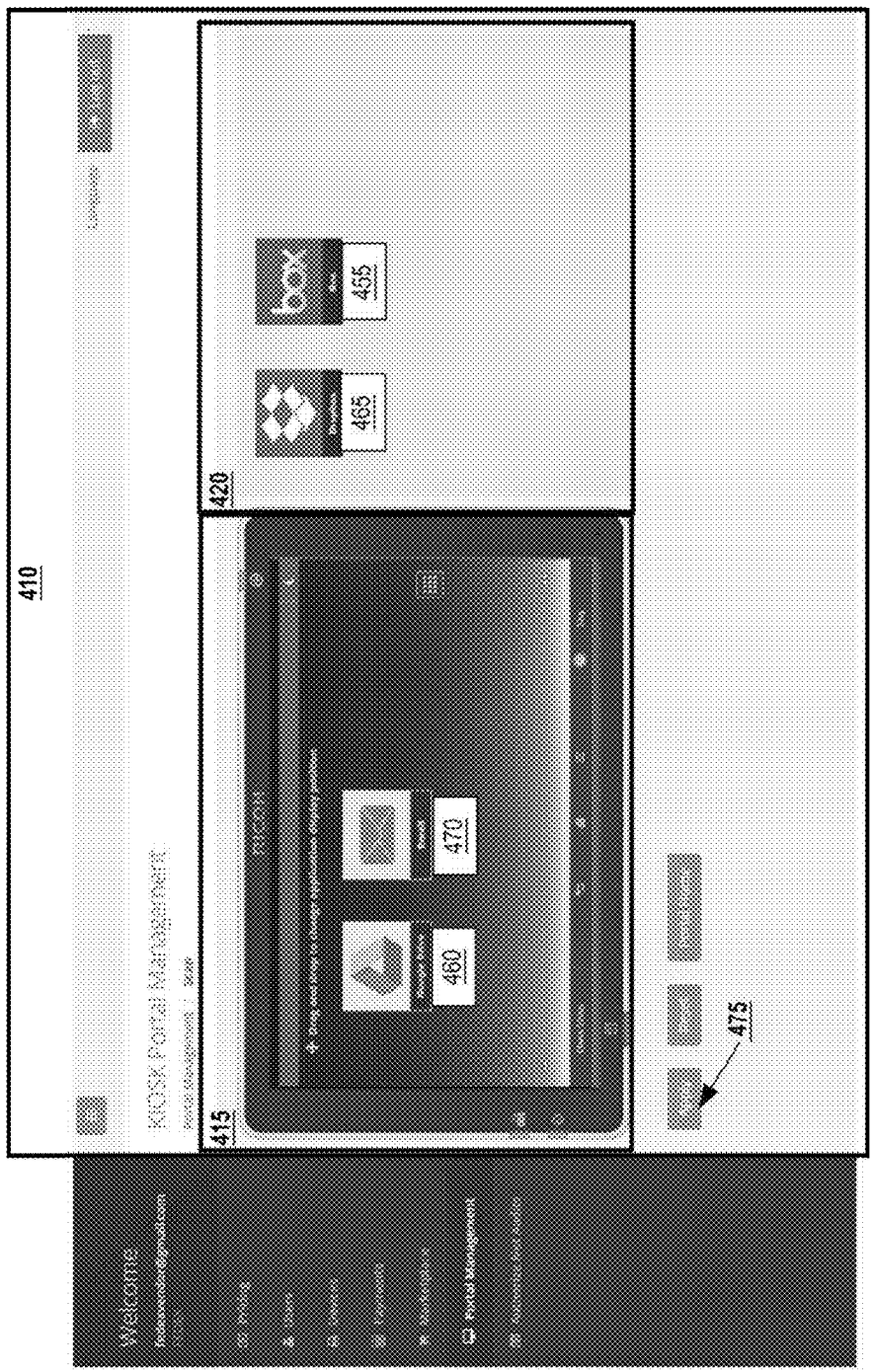

Referring back to FIG. 4B, an embodiment of the modification request may be a request to disable a specific application service by moving a currently enabled application service from the virtual MFP display 415 to the workspace 420. The modification request may be generated as a result of a move action performed by the user client 150. For example referring to FIG. 4B, a user may perform a move action by selecting Dropbox service icon 465 and then dragging the Dropbox service icon 465 to workspace 420. FIG. 4C depicts the result of moving the Dropbox service icon 465 to workspace 420. In FIG. 4C, the Dropbox service icon 465 is displayed in the workspace 420 and the virtual MFP display 415 no longer contains the Dropbox service icon 465. In an embodiment, by performing the move action to disable the Dropbox service icon 465, a modification request is generated by user client 150 and sent to the MFP server administration service 110.

An embodiment of generating the modification request to disable the Dropbox service icon 465 from the current set of available application services may be accomplished using different types of move actions. Other embodiments of the move action include, but are not limited to, a select and swipe motion, a select and right-click to move motion, or any other configured sequence of inputs that represent a move action. For example, the select and swipe action may be performed by selecting the Dropbox service icon 465 and then performing a swiping motion in the direction of the workspace 420. The select and swipe action may result in generating a modification request that is sent to the MFP server administration service 110. In another example, the select and right-click to move motion may be performed by selecting an application service icon and then performing a right-click operation which may trigger a dropdown menu that includes the option to move the selected application service icon to the workspace 420.

In another embodiment, the modification request is generated only after the user presses apply button 475, as depicted in FIG. 4C. In this embodiment, the user may move multiple application services into the workspace 420 before generating a modification request.

In an embodiment, the MFP server administration service 110 may receive a request to disable an entire set of application services from user client 150. User client 150 may generate a request to disable an entire set of application services associated within a specific category by moving the application category to the workspace 420. For example in FIG. 4A, user client 150 may perform a move action to move the scan category icon 430 to the workspace 420. By doing so, the modification request may be a request to disable the scan category and all of the application services within the scan category.

Referring back to FIG. 2, step 215 depicts the MFP server administration service 110 generating a modified set of enabled application services in response to receiving the modification request from the user client 150. Using the previous example, if the modification request is a request to disable the Dropbox application service, then the MFP server administration service 110 may modify the current set of enabled application services by removing from the current set of enabled applications the Dropbox application service associated with the Dropbox service icon 465.

In an embodiment, if the modification request is a request to disable an entire category, then the MFP server administration service 110 may disable the entire set of application services associated with the particular category. For example, if the modification request received was a request to disable the scan category and the application services within the scan category, then the MFP server administration service 110 may disable the scan category and all application services within the scan category set.

At step 220 is depicted enabling the modified set of application services on the associated MFP devices 130. In an embodiment, the MFP server administration service 110 enables the modified set of application services by sending data containing the modified set of application services to the MFP devices 130 associated with the vendor-administrator account. Embodiments of sending the data may include, but is not limited to, sending a formatted JSON message, an XML message, or any other standardized data structure. The modified set of application services contains the enabled application services. In an embodiment, the modified set of application services may include services for a specific application category that was modified by the user client 150. The modified set of application services may be sent to the MFP devices 130 via the network. Using the previous example and FIG. 4C, the modification request was a request to disable the Dropbox service icon 465. As a result, the MFP server administration service 110 generated a modified set of application services that includes the Google Drive and Email application services. The modified set of application services is enabled when the MFP server administration service 110 sends the modified set of enabled services to the MFP devices 130. In an embodiment, the MFP devices 130 may receive data specifying the modified set of application services. The MFP devices 130 may be configured to update their MFP display to only show the application services that are enabled, which corresponds to the received list of modified application services.

In an alternative embodiment, the MFP server administration service 110 may enable the modified set of application services by storing the modified set of application services within the MFP server 105. The MFP server administration service 110 may be configured to send data containing the modified set of application services to the MFP devices 130 associated with the vendor-administrator account, in response to a request for application services from the MFP devices 130. For example, a particular MFP device, when used by a particular customer, may query the MFP server 105 on demand for the current list of active application services for a particular category. In response to receiving a request from an MFP device, the MFP server application service 115 may return data containing the modified set of application services to the particular MFP device.

In an embodiment, the MFP server administration service 110 sends an acknowledgment message to the user client 150 to alert the user client 150 of the successful enablement of the modified set of application services. Examples, of the acknowledge messages may be received and presented to the vendor-administrator as a pop-up window within the user client 150 display, or any other digital notification that may alert the vendor-administrator of the update.

In an embodiment, if the MFP server administration service 110 disabled an entire category and the application services within the particular category, then the MFP server administration service 110 may send data to the MFP devices 130 associated with the vendor-administrator account that specify that the particular category that has been disabled and a set of application services that have been disabled within that particular category.

4.1.2. Enable Application Service

Another embodiment of the modification request is a request to enable a new application service within a specific category. Referring back to FIG. 2, step 210 may depict an embodiment of receiving a modification request to enable a new application service. For example, referring to FIG. 4B, the vendor-administrator may enable a new application service by moving a currently disabled application service from the workspace 420 to the virtual MFP display 415. Specifically, the vendor-administrator may perform a move action on Box service icon 455 and move the Box service icon 455 from the workspace 420 to the virtual MFP display 415. In an embodiment, the move action performed by the vendor-administrator, results in sending a modification request from the user client 150 to the MFP server administration service 110. As described above, embodiments of the move action may include, but are not limited to, a select and swipe motion, a select and right-click to move motion, or any other configured sequence of inputs that represent a move action.

In an embodiment, the MFP server administration service 110 may receive a request to enable an entire set of application services from user client 150. User client 150 may generate a request to enable an entire set of application services associated with a specific category by moving an application category from the workspace 420 to the virtual MFP display 415 using the same move action described for enabling a single application service.

Referring back to FIG. 2, step 215 represents the MFP server administration service 110 generating a modified set of enabled application services in response to receiving the modification request. Using the previously described example, if the modification request is a request to enable the Box service icon 455, then the MFP server administration service 110 may modify the current set of enabled application services for the scan category by adding the Box application service to the current set of enabled application services. The result of adding the Box application service to the current set of application services is a new modified set of application services that includes the previously enabled application services and the Box application service.

Step 220 depicts an embodiment of enabling the modified set of application services on the associated MFP devices 130. The MFP server administration service 110 enables the modified set of application services by sending data containing the modified set of application services to the MFP devices 130 associated with the vendor-administrator account.

4.1.3. Modify Arrangement of Application Services

In another embodiment, the modification request may be a request to modify the order of the application services displayed within a specific category on MFP devices 130. Referring back to FIG. 4B, the virtual MFP display 415 displays the currently enabled applications for the scan category as they appear on specific MFP devices 130. The currently enabled applications services, from left to right, include Google Drive 460, Dropbox 465, and Email 470. If the vendor-administrator desires to modify the current order of application services, then the vendor-administrator may perform a modification request to modify the current order of the enabled application services by selecting one or more application services and moving their application icon locations to different locations within the virtual MFP display 415.

Referring back to FIG. 4B, the modification request may specify a new location within the current display of the virtual MFP display 415 for a specific application service.

Figure 4D:
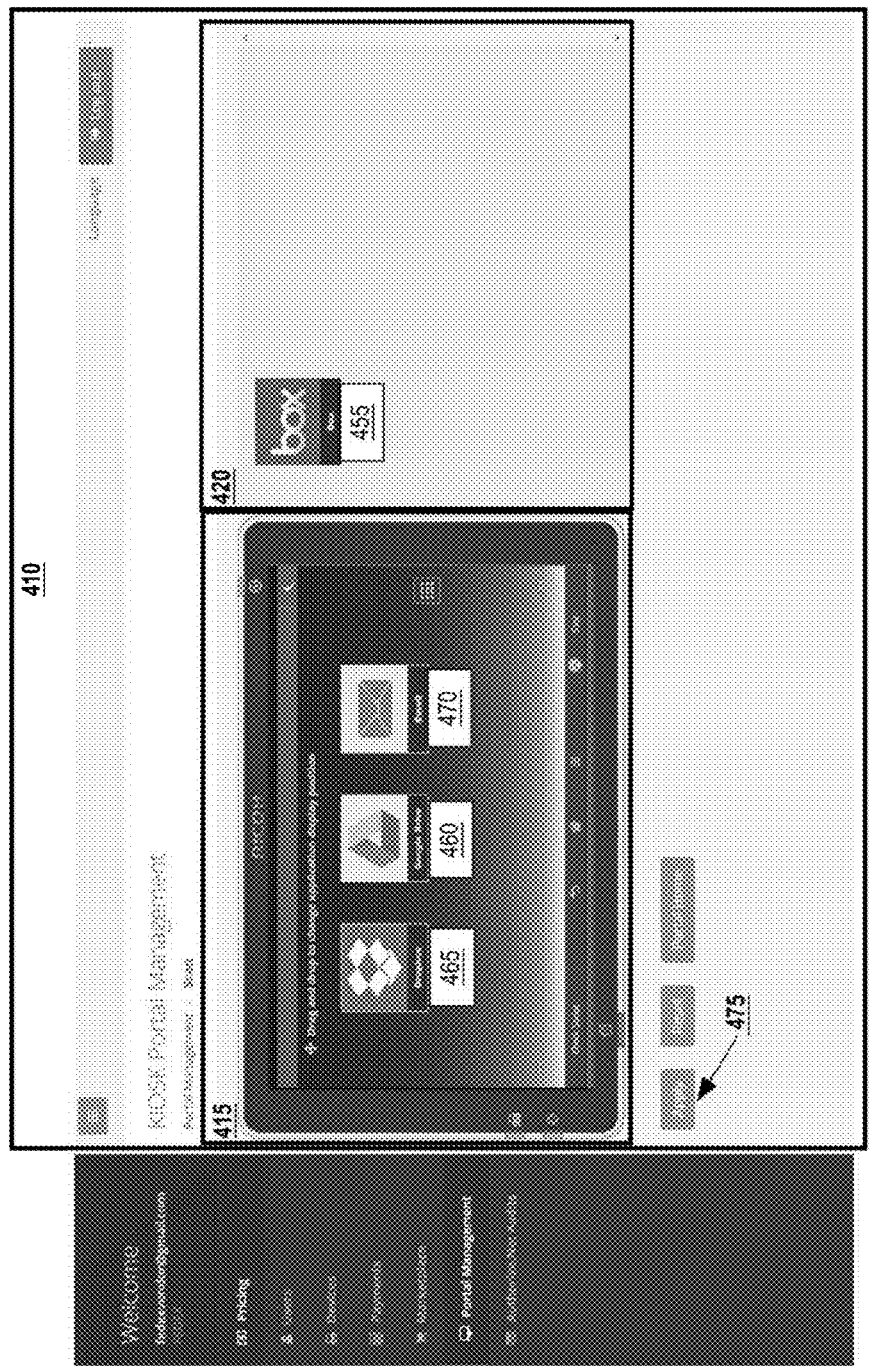

For example, the Dropbox icon 465 is displayed in the second position from the left. If the vendor-administrator desires to move the Dropbox icon 465 to the first position from the left, then the vendor-administrator may perform a modification request by selecting the Dropbox icon 465 and moving the Dropbox icon 465 to the first position from the left. In an embodiment, in order to accommodate the new position of the Dropbox icon 465, the Google Drive icon 460, which was previously in the first position to the left, may be shifted one position to the right. FIG. 4D depicts an example embodiment of the updated positions of the application services with the Dropbox icon 465 in the first position from the left, the Google Drive icon 460 in the second position from the left, and the Email icon 470 in the third position from the left. In an embodiment, step 210 in FIG. 2 represents the MFP server administration service 110 receiving a modification request to modify the arrangement order of the enabled application services.

Embodiments of the modification request to modify the arrangement of application services may include a modification action performed by selecting and dragging a particular application service to a new location within the virtual MFP display 415. Other embodiments of the modification action may include any other affirmative input that selects a particular application service and moves the location of the particular application service to a new location within the virtual MFP display 415. For example, a user may select a particular application service and then one or more controls, such as GUI controls, to change the location of the particular application service within the virtual MFP display 415.

Step 215 depicts an embodiment of the MFP server administration service 110 generating a modified set of enabled application services in response to receiving the modification request, from the user client 150, to change the arrangement order of the set of enabled application services. Using the previous example, if the modification request is a request to move the Dropbox icon 465 to the first position from the left in the set of enabled application services, then the MFP server administration service 110 modifies the current set of enabled application services to specify the new location of the Dropbox application service, represented by Dropbox icon 465, and any other application services that may have new display locations. In an embodiment, the set of application services may contain location information specifying the location of each application service on the display screen.

As described in the previous sections, step 220 depicts enabling the modified set of application services on the associated MFP devices 130. In an embodiment, the MFP server administration service 110 enables the modified set of application services by sending data containing the modified set of application services to the MFP devices 130 associated with the vendor-administrator account.

4.2. System Administrator

In an embodiment, the system administrator may send modification requests to the MFP server administrator 110 to modify application service categories such as creating or deleting application service categories or moving application services between different application service categories. In an embodiment, the system administrator may automatically enable or disable one or more application services within vendor specific categories and sub-categories.

Figure 5:
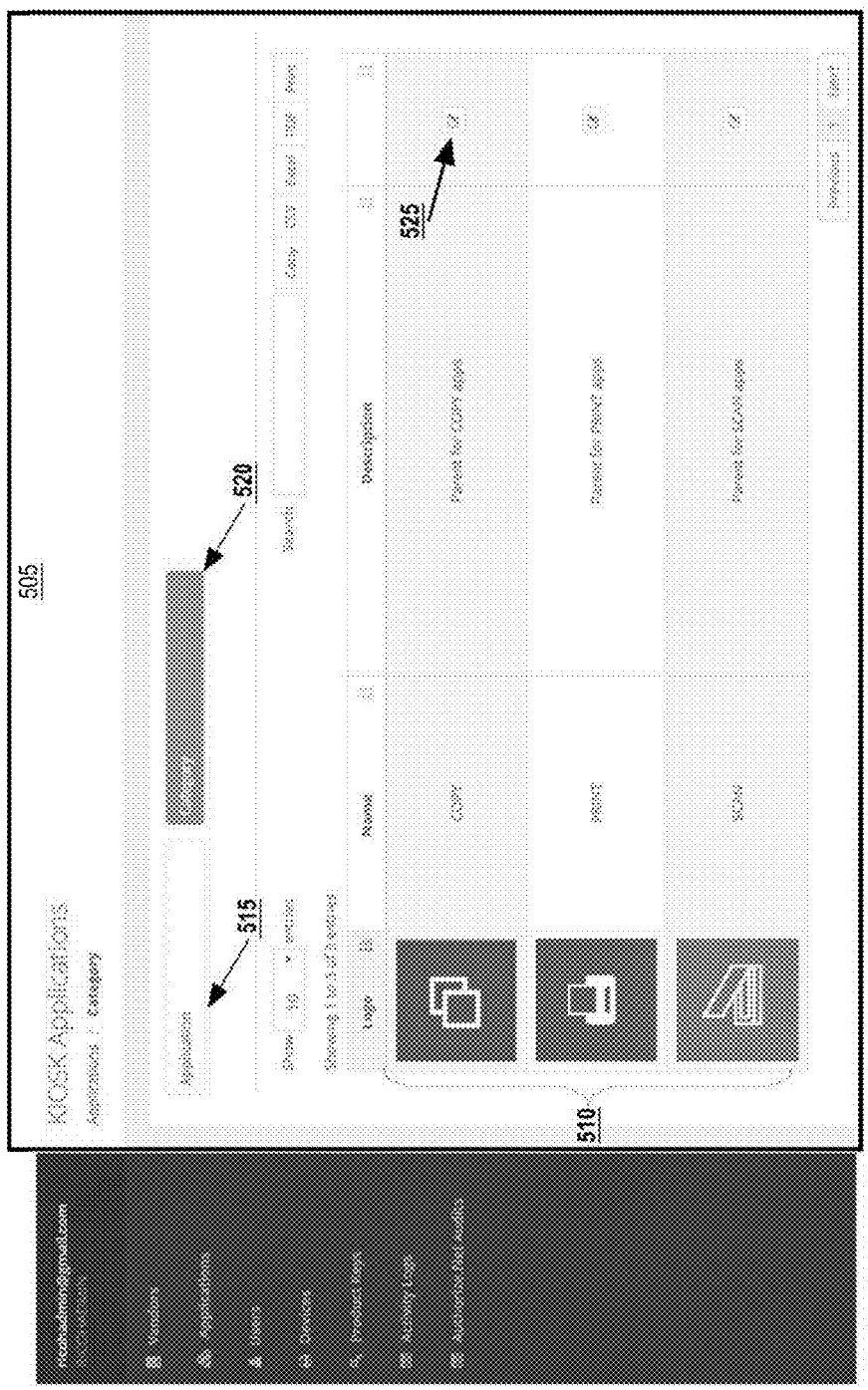
FIG. 5 is an example embodiment of a display screen displaying a system administrator configuration window.

Referring back to FIG. 2, steps 205 through 220 may depict steps to modify application service categories and/or application services within different categories based on a received request from a system administrator. In an embodiment, step 205 depicts the step of the MFP server administrator service 110 displaying configuration options specific to the system administrator account. In an embodiment, the MFP server administrator service 110 displays available application service categories on the user client 150. FIG. 5 depicts an embodiment of the system administrator configuration window. In an embodiment, system configurator window 505 is a configuration window that displays available application service categories and/or application services. A system administrator may toggle between lists of application services and categories using the application view button 515 and the category view button 520 respectively. In FIG. 5, the category view button 520 is selected, therefore the system configurator window 505 displays the available application service categories in category list 510. If a system administrator desires to edit properties to a specific category, then the system administrator may select the specific category and then choose to edit button 525 to edit the selected category. Embodiments of editing an existing category may include, but are not limited to, editing properties of the category such as name and appearance of the icon, editing the application services and sub-categories within the category, deleting the category, and assigning the category to specific vendor accounts. In an embodiment, the system administrator may also create new categories that may be added to the category list 510.

4.2.1 System Administrator Modification Requests

In an embodiment, a system administrator may add, delete, or modify application service categories and sub-categories. Referring back to FIG. 2, at step 210 the MFP server administrator service 110 receives a modification request from a system administrator using client device 150.

In an embodiment, the modification request may be a request to add a category or sub-category. The modification request may specify the name and attributes for a particular category including specific application services that are to be associated with the particular category or subcategory. In an embodiment, if the request is a request to add a specific category then the system administrator may specify, from a list of available application services, which services may be associated with the newly created category. In another embodiment, if the request is a request to add a specific sub-category then the system administrator may specify, from a list of application services already associated with the parent category of the newly created sub-category, which services may be associated with the newly created sub-category. For example, if the system administrator wants to create a new sub-category of the scan category called cloud-storage scanning and the available application services currently in the scan category include: Google Drive 460, Dropbox 465, and Email 470; then the system administrator may choose application services from the list of application services already associated with the scan category. For instance, the system administrator may choose to move the Google Drive 460 and Dropbox 465 icons into the cloud-storage scanning sub-category. In yet another embodiment of sub-category creation, the system administrator may choose which application services to associate with the new sub-category from a list of all available application services.

In an embodiment, the modification request may be a request to delete a category or sub-category. If the modification request is a request to delete a specific sub-category then the MFP server administrator service 110 may delete the selected sub-category and move the application services associated with the deleted sub-category to the parent category based upon the category hierarchy. Using the previous example, if the system administrator requests to delete the cloud-storage scanning sub-category, then the associated application services Google Drive and Dropbox may be reassigned to the parent scan category.

In another embodiment if the modification request is a request to delete a parent category, then associated application services may be automatically disabled and moved to an unclassified category, where the system administrator may reassign the application services to other existing categories. In an embodiment, sub-categories of a deleted category may be either automatically deleted or may be promoted up one level to a parent category. In the scenario of promoting sub-categories to parent categories, any sub-categories of sub-categories may also be promoted one level up as well, thereby maintaining their hierarchy to their parent.

In an embodiment, the modification request from a system administrator may be a request to modify the categories associated with particular application services. For example, if the Google Drive application service is currently associated with the scan category, then the system administrator has the ability of generating a modification request to associate the Google Drive application service to the print category. In this scenario, the modification request received by the MFP server administrator service 110 would specify an update to the specific application service Google Drive.

In an embodiment, at step 215 the MFP server administrator service 110 generates a new and/or modified category based upon the modification request received. Using the previous example, if the modification request specified creating a new sub-category, cloud-storage scanning, and associating application services Google Drive and Dropbox to the cloud-storage scanning sub-category, then the MFP server administrator service 110 may generate a new category object named cloud-storage scanning and may associate the application services Google Drive and Dropbox to the newly created category object. Additionally, the MFP server administrator service 110 may modify the set of application services associated with the scan category to remove previously associated application services Google Drive and Dropbox from the current set of application services.

In another embodiment, the parent category association to application services may be preserved for inheritance purposes. For example, the application services Google Drive and Dropbox may still be associated with the scan category but, during display may only be displayed within the lowest level category, in this instance the cloud-storage scanning category.

In an embodiment, if the modification request is a request to delete an application sub-category, then the MFP server administrator service 110 may modify the set of application services to either move the application services from a deleted sub-category to the parent category. In an embodiment, if the modification request is a request to delete an application category, then the MFP server administrator service 110 may modify the set of application services to disable application services within the category and disable the category itself.

In an embodiment, if the modification request is a request to move an application service from one category to another category, then the MFP server administrator service 110 may modify the set of application services associated with the original category to remove the specific application service and the MFP server administrator service 110 may modify the set of application services associated with new category to add the specific application service. For example, if the modification request specified that the Google Drive application service is to be moved from the scan category to the print category, then the MFP server administrator service 110 may remove the Google Drive application service from the set of application services associated with the scan category and may add the Google Drive application service to the set of application services associated with the print category.

At step 220 the MFP server administrator service 110 enables the category changes on the MFP devices 130. In an embodiment, the MFP server administration service 110 enables the modified categories and associated application services by sending data containing the modified categories and associated application services to the MFP devices 130.

In an embodiment, the MFP server administration service 110 may also send an acknowledgment message to the user client 150 to alert the user client 150 of the successful enablement of the modified categories and application services. Examples, of the acknowledge messages may be received and presented to the system administrator as a pop-up window within the user client 150 display, or any other digital notification that may alert the vendor-administrator of the update.

4.2.2. Enable/Disable Application Services

In an embodiment, the MFP server administrator service 110 is configured to enable and/or disable application services from multiple categories for multiple vendors. This functionality allows the system administrator the flexibility to control which application services are available for use at any time, regardless of the category that which the application service belongs. For example, if the Dropbox application service needs to be disabled for a scheduled maintenance, then the system administrator may send a request to the MFP server administrator service 110 to disable the Dropbox application service from all categories that contain the Dropbox application service, which may include multiple custom vendor categories and/or sub-categories.

FIG. 6 depicts an example flow diagram of a method for modifying the availability of one or more application services in multiple sets of application services implemented on MFP devices based upon a request from a system administrator. FIG. 6 contains user client 150, MFP server 105, MFP server administration service 110, MFP server application service 115, MFP device group A 630, and MFP device group B 635. MFP device group A 630 and MFP device group B 635 each depict a set of MFP devices from the MFP devices 130, where MFP device group A 630 may represent MFP devices associated with vendor A and MFP device group B 635 may represent devices associated with vendor B.

Figure 7A:
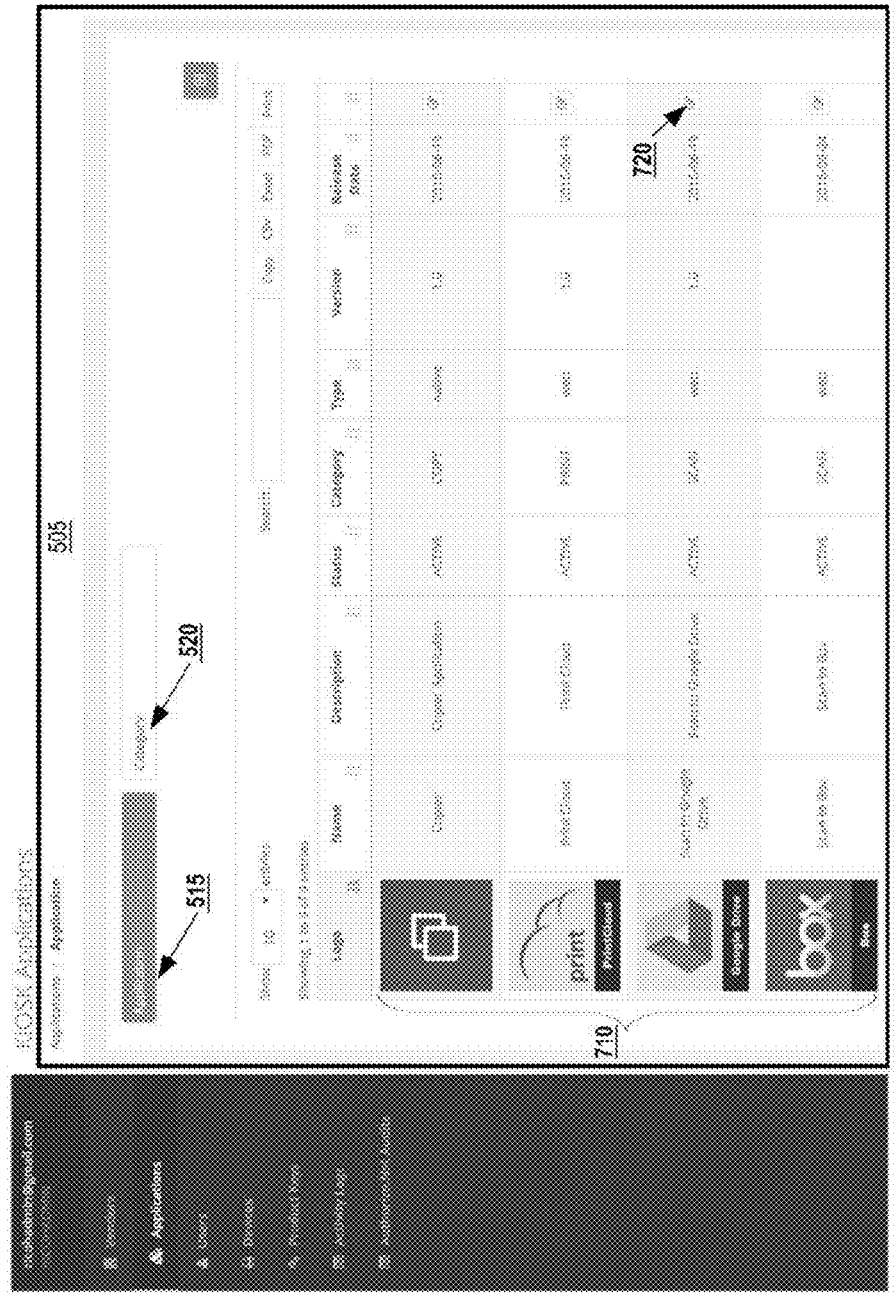
FIGS. 7A and 7B are example embodiments displaying application service status screens for available application services.

Step 605 depicts an embodiment of the MFP server administration service 110 displaying application service status details to the system administrator on the client device 105. FIG. 7A depicts an example embodiment of displaying the application service status details to the system administrator on the client device 105. In an embodiment, the application service status details are displayed within the system configurator window 505. The application view button 515 is highlighted and therefore the system configurator window 505 displays the available application services in application service list 710. If a system administrator desires to edit the status property for a specific application service, then the system administrator may select the specific application service and then choose to edit button 720 to edit the status of the selected application service. Embodiments of editing the status include enabling and disabling the application service.

Figure 7B:
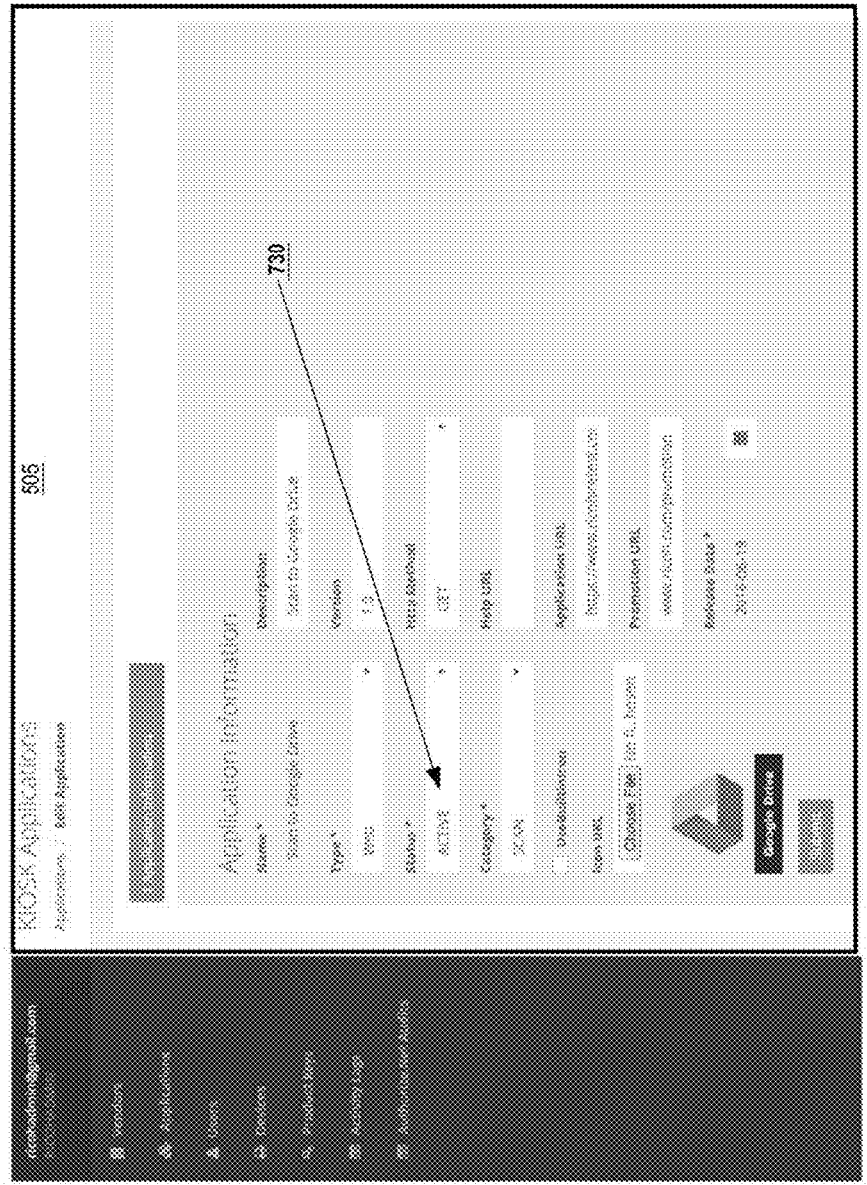

FIG. 7B depicts an embodiment to displaying application service properties for a particular application service, including the status property. Status property 730 represents the current status of the particular application service. In an embodiment, the system administrator may toggle between active and inactive in order to enable or disable the particular application service.

At step 610, the MFP server administrator service 110 receives an application service modification request from a system administrator using client device 150. In an embodiment, the application service modification request may be a request to enable one or more application services or a request to disable one or more application services. In an embodiment, if the request is a request to disable one or more application services, then the MFP server administrator service 110 may disable the selected application services from all categories that include the selected application services. For example, the request received by the MFP server administrator service 110 may include a request to disable the Google Drive application service. In another example the request received by the MFP server administrator service 110 may include a request to disable the Google Drive application service and the Dropbox application service. In another embodiment, the request received by the MFP server administrator service 110 may include a request to enable one of more application services that are currently disabled.

At step 615, the MFP server administrator service 110 updates the status of the application services specified in the received request and generates one or more modified sets of application services based on the status changes made to the application services. In an embodiment, the MFP server administrator service 110 may enable or disable application services according to the details of the received request. For example, if the request specified disabling the Google Drive application service, then the MFP server administrator service 110 would update the properties of the Google Drive application service to reflect that it has been disabled. By disabling the Google Drive application service, the Google Drive application service would not be available for use by users of the MFP devices 130.

In an embodiment, disabling an application service may include making the particular application service not visible to users and vendor-administrators. For example, if the Google Drive application service has been disabled, then a vendor-administrator would not be able to see the Google Drive application service in any particular category or within the workspace 420. In an embodiment, disabling an application service may also remove subscribed application services from the workspace 420 for multiple vendor accounts. When an application service is disabled, it is no longer accessible by vendors who subscribe to the application service, therefore disabling an application service acts as if the application service has been unsubscribed and is not visible within the workspace 420 for vendors. In an embodiment, historical transaction data associated with a particular vendor account for a disabled the application service is preserved by the MFP server administrator service 110. By doing so, when the application service is re-enabled, the vendor-administrator may access the historical transaction data for the application service. Additionally, the MFP server administrator service 110 may be configured to allow access to historical transaction data for the application service even when the application service is disabled.

In an embodiment, disabling a particular application service may be configured to temporarily remove the application service from view in associated categories, but not remove the particular application service from an associated category. For example, disabling the Google Drive application service may temporarily remove the Google Drive application service from the scan category while it has been disabled. Once the Google Drive application service is enabled, then the Google Drive application service would be visible again in the scan category. The benefit to temporarily removing, but not permanently removing the application service from a particular category when disabled, is that it allows for application services to periodically be disabled for maintenance without requiring vendor-administrators to reconfigure application services in categories each time an application service is updated. For example, the Google Drive application service, which is part of the scan category for vendor A, may be disabled for a one hour period for maintenance. During that period the Google Drive application service would not appear in the scan category view for vendor-administrator A and for users of MFP devices associated with vendor A. After maintenance is completed, then the Google Drive application service may be enabled and visible in all associated application categories. For maintenance updates such as these, vendor-administrators would not be required to manually update the Google Drive application service in order to ensure that the Google Drive application service shows up in the scan category.

In another embodiment, disabling a particular application service may be configured to remove the application service from view and may remove the application service from categories that the application service is associated. Using the previous example, if the Google Drive application service is disabled, then the Google Drive application service may be permanently removed from the associated scan category. If the Google Drive application service is enabled again, then a vendor-administrator may need to manually add the Google Drive application service back to the scan category once again. By requiring an affirmative step to add a previously disabled application service back to a category, vendor-administrators have better control over the application services associated with categories. For example, if the Google Drive application service has been disabled for a prolonged period of time, then a vendor-administrator may replace the Google Drive application service with a different service for cloud storage without having to worry about the Google Drive application service becoming available again and competing with the new application service commissioned to replace the Google Drive application service.

In an embodiment, if the received request from the client device 105 is a request to enable one or more application services, then the MFP server administrator service 110 would update the properties of the one or more application services to reflect that they have been enabled. By enabling the one or more application services, the one or more application services would be visible and available for use by users of the MFP devices 130. Using the previous example, if the Google Drive application service has been disabled and the request received from client device 150 is a request to enable the Google Drive application service, then the MFP server administration service 110 would update the status property for the Google Drive application service to enabled. As a result, the Google Drive application service may become visible in associated categories, such as the scan category. If the Google Drive application service is not associated with any particular category, then the Google Drive application service would become visible in the workspace 420.

In an embodiment, if disabling an application service included removing the disabled application service from any associated category, then the MFP server administrator service 110, when processing a request to enable the application service, may also include generating and sending a notification to vendor-administrators notifying the vendor-administrators that the application service has now been enabled and may be added to various categories.

In an embodiment, after updating the status of the one or more application services, the MFP server administrator service 110 may generate one or more modified sets of application services for categories affected by status changes to the one or more application services. For example, if the Google Drive application service was disabled as a result of a received request and the Google Drive application service is part of the categories, "vendor A scan-to-cloud" and "vendor B free-scan-services", then the MFP server administrator service 110 may generate an updated set of application services for categories "vendor A scan-to-cloud" and "vendor B free-scan-services."

In an embodiment, generating an updated set of application services may include determining which application services belong to the set of application services by evaluating whether the status property for each application service is set to enabled. If application services associated with a particular category have their status property set to disabled, then the application services would not be included as part of the updated set of application services for a particular category.

Referring back to FIG. 6, at step 620 the modified sets of application services are enabled. In an embodiment, the MFP server administration service 110 enables the modified sets of application services by sending data containing modified sets of application services for specific vendor accounts to sets of MFP devices associated with each of the specific vendor accounts. For example, in FIG. 6 data for a first modified set of application services associated with vendor A is sent to the MFP device group A 630 and data for a second modified set of application services associated with vendor B is sent to the MFP device group B 635. Embodiments of sending the data may include, but is not limited to, sending a formatted JSON message, an XML message, or any other standardized data structure. The modified sets of application services contain the enabled application services associated with the category for the specific vendor accounts.

In an embodiment, the MFP server administration service 110 may also send an acknowledgment message to the user client 150 to alert the system administrator using the user client 150 of the successful status changes to the one or more application services and enablement of the modified categories. Examples, of the acknowledge messages may be received and presented to the system administrator as a pop-up window within the user client 150 display, or any other digital notification that may alert the vendor-administrator of the update.

5. MFP Server Application Service

In an embodiment, customers may interact with enabled applications on MFP devices 130. MFP Devices 130 are configured to communicate service requests, via the network, to the MFP server application service 115. Service requests may represent specific requests for application services associated with one or more server-side endpoints. Server-side endpoints may be an entity, processor, or resource that can be referenced and to which web service messages can be addressed. Endpoints are used by third party resources to access server-side APIs. For the purposes of explanation the server-side endpoint locations are represented in FIG. 1 as external servers 140.

FIG. 8 depicts an example embodiment of the MFP server application service receiving a service request, determining the appropriate endpoint for the request, sending the service request to the appropriate endpoint, and receiving a service response back from the endpoint.

In an embodiment, at step 805 the MFP server application service 115 receives a service request from the MFP device 130. The MFP device 130 may be configured to generate a specifically formatted service request that specifies request parameters including, but not limited to, customer account information, application service information, document data, and other data that specifies application service configuration that may be related to the specific vendor, the specific MFP device 130 used, and/or the specific customer using the MFP device 130. An example of a server request from a MFP device 130 is a scan and save request from a customer that scanned a document on the MFP device 130 and is requesting to save the scanned document in a folder within their Dropbox account.

In an embodiment, customer account information may include information related to the specific customer and the application service used by the customer, such as the customer's login credentials for specific application services such as Google Drive, Dropbox, Email, or any other enabled application service.

In an embodiment, application service information enclosed in the service request may include data that specifies the specific application service requested. For example, if the specific customer initiates a scan and intends to save the scanned document in Dropbox, then the application service information, within the service request, may specify information identifying the Dropbox application and specific requested actions for the Dropbox application. In an embodiment, the application service information may be formatted in a standardized format where defined parameters are used to identify the application service used on the MFP device 130.

In an embodiment, document data may include the data processed by the MFP device 130 itself. For example, if the customer performs a scan on the MFP device 130, then the document data may include the digital image of the document scan and any other metadata generated during the scan of the document.

At step 810, the MFP server application service 115 formats the service request and sends to the service request to the appropriate endpoint associated with the application service identified within the service request. Using the previous example, if the service request specified saving a scanned document in a Dropbox folder of the particular customer, then the MFP server application service 115 would determine from the data within the service request the specified application service as Dropbox and the login credentials associated to the specific customer. In an embodiment, the MFP server application service 115 formats the data within the service request to conform with input message parameters specific to the endpoint. For example, if the MFP server application service 115 determines that the service request message is a scan and save to the customer's specific Dropbox folder, then the MFP server application service 115 may format the request to conform to defined API call request parameters for the Dropbox endpoint.

In an embodiment, formatting the service request to conform to defined API call request parameters may include different format configurations specific to the endpoint destination. For example, formatting service requests for Google Drive may by different from the formatting required for Dropbox, or any other enabled application. In an embodiment formatting for each specific application service endpoint may use different parameters from the service request. For instance, the email service endpoint may only require a customer's email address and email credentials, while a Dropbox service endpoint may require the customer's Dropbox credentials, and a specific destination folder within the customer's account.

Referring back to FIG. 8, step 815 depicts the MFP server application service 115 receiving a result back from the external servers 140. In an embodiment, the endpoint application service on the external servers 140 is configured to send a result back to the MFP server application service 115. Examples of a result may include, but are not limited to, an acknowledgement message, a result set of a list of files within the destination folder, or any other message to indicate that the request has been executed.

At step 820 the MFP server application service 115 formats and sends the result to the MFP device 130 to be presented to the customer. For example, if the result from the external servers 140 is an acknowledgement message indicating that the scanned file has been saved in the desired Dropbox folder, then the MFP server application service 115 may format the acknowledgement message and send the message to the MFP server 130 such that the message displayed on the MFP server 130 display screen shows that the scanned document has been saved in the customer's Dropbox folder. Embodiments of the message displayed may include, but are not limited to, text stating the document has been saved, a list of all current files in the Dropbox folder including the scanned document, or any other acknowledgement message.

6. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

FIG. 9 is a flow diagram that depicts an example computer system 900 upon which embodiments may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. Although bus 902 is illustrated as a single bus, bus 902 may comprise one or more buses. For example, bus 902 may include without limitation a control bus by which processor 904 controls other devices within computer system 900, an address bus by which processor 904 specifies memory locations of instructions for execution, or any other type of bus for transferring data or signals between components of computer system 900.

An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic or computer software which, in combination with the computer system, causes or programs computer system 900 to be a special-purpose machine. According to one embodiment, those techniques are performed by computer system 900 in response to processor 904 processing instructions stored in main memory 906. Such instructions may be read into main memory 906 from another non-transitory computer-readable medium, such as storage device 910. Processing of the instructions contained in main memory 906 by processor 904 causes performance of the functionality described herein. In alternative embodiments, hard-wired circuitry may be used in place of or in combination with software instructions to implement the embodiments. Thus, embodiments are not limited to any specific combination of hardware circuitry and software.

The term "non-transitory computer-readable medium" as used herein refers to any non-transitory medium that participates in providing data that causes a computer to operate in a specific manner. In an embodiment implemented using computer system 900, various computer-readable media are involved, for example, in providing instructions to processor 904 for execution. Such media may take many forms, including but not limited to, non-volatile and volatile non-transitory media. Non-volatile non-transitory media includes, for example, optical or magnetic disks, such as storage device 910. Volatile non-transitory media includes dynamic memory, such as main memory 906. Common forms of non-transitory computer-readable media include, without limitation, a floppy disk, a flexible disk, hard disk, magnetic tape, or any other magnetic medium, a CD-ROM, any other optical medium, a RAM, a PROM, and EPROM, a FLASH-EPROM, any other memory chip, memory cartridge or memory stick, or any other medium from which a computer can read.

Various forms of non-transitory computer-readable media may be involved in storing instructions for processing by processor 904. For example, the instructions may initially be stored on a storage medium of a remote computer and transmitted to computer system 900 via one or more communications links. Bus 902 carries the data to main memory 906, from which processor 904 retrieves and processes the instructions. The instructions received by main memory 906 may optionally be stored on storage device 910 either before or after processing by processor 904.

Computer system 900 also includes a communication interface 918 coupled to bus 902. Communication interface 918 provides a communications coupling to a network link 920 that is connected to a local network 922. For example, communication interface 918 may be a modem to provide a data communication connection to a telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be processed by processor 904 as it is received, and/or stored in storage device 910, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus for providing an improvement in modifying application services that are currently implemented on multi-function peripherals (MFPs), the apparatus comprising:
   one or more processors; and
   one or more memories storing instructions which, when processed by one or more processors, cause:
      a server administration service executing on the server computer causing to be displayed on a client device, via one or more networks, a graphical user interface that is associated with a system administrator user and includes graphical user interface controls for displaying a category view and an application view, wherein the category view displays a plurality of categories of application services that are available for implementation by each vendor-administrative user, from a plurality of vendor-administrative users, on their respective plurality of MFPs,
      wherein the application view displays a plurality of application services that are available for assignment by each vendor-administrative user, from the plurality of vendor-administrative users, to categories of application services implemented on their respective plurality of MFPs,
      the server administration service, executing on the server computer, receiving from an administrative user of the client device via the one or more networks, a request to modify a particular application service from the plurality of application services that are available for assignment by each vendor-administrative user, from the plurality of vendor-administrative users, to the categories of application services implemented on their respective plurality of MFPs;
      the server administration service, in response to receiving from the administrative user of the client device via the one or more networks, the request to modify a particular application service from the plurality of application services that are available for assignment by each vendor-administrative user, from the plurality of vendor-administrative users, to the categories of application services implemented on their respective plurality of MFPs:
         determining one or more categories of application services that include the particular application service,
         determining one or more particular vendor-administrative users, from the plurality of vendor-administrative users, that currently have implemented the one or more categories of application services that include the particular application service,
         determining a plurality of MFPs that are associated with the one or more particular vendor-administrative users that currently have implemented the one or more categories of application services that include the particular application service, and
         causing the modification to the particular application service to be implemented on each MFP, from the determined plurality of MFPs that are associated with the one or more particular vendor-administrative users that currently have implemented the one or more categories of application services that include the particular application service.

2. The apparatus of claim 1, wherein the request to modify the particular application service from the plurality of application services that are available for assignment by each vendor-administrative user, from the plurality of vendor-administrative users, to the categories of application services implemented on their respective plurality of MFPs is a request to modify an attribute of the particular application service, disable the particular application service, or remove the particular application service.

3. The apparatus of claim 1, wherein the one or more memories storing instructions which, when processed by one or more processors, further cause:
   the server administration service, executing on the server computer, receiving from the administrative user of the client device via the one or more networks, a request to modify a particular category of application services, from the plurality of categories of application services that are available for implementation by each vendor-administrative user, from a plurality of vendor-administrative users, on their respective plurality of MFPs, and
   the server administration service, in response to receiving from the administrative user of the client device via the one or more networks, the request to modify a particular category of application services from the plurality of categories of application services that are available for assignment by each vendor-administrative user, from the plurality of vendor-administrative users, to the categories of application services implemented on their respective plurality of MFPs:
  generating a modified particular category of application services, and
  causing the modified particular category application services to be implemented on each MFP, from the respective plurality of MFPs for each vendor-administrative user, from the plurality of vendor-administrative users, that currently has the particular category of application services implemented thereon.

4. The apparatus of claim 3, wherein the request to modify a particular category of application services, from the plurality of categories of application services that are available for implementation by each vendor-administrative user, from a plurality of vendor-administrative users, on their respective plurality of MFPs is one or more of a request to add a new application service to the particular category of application services, a request to disable or remove a particular application service from the particular category of application services, a request to change an attribute of the particular category of application services, or a request to change an order of application services within the particular category of application services.

5. The apparatus of claim 3, wherein the one or more memories storing instructions which, when processed by one or more processors, further cause:
  in response to causing the modified particular category application services to be implemented on each MFP, from the respective plurality of MFPs for each vendor-administrative user, from the plurality of vendor-administrative users, that currently has the particular category of application services implemented thereon, maintaining historical data for the particular category of application services.

6. The apparatus of claim 1, wherein the one or more memories storing instructions which, when processed by one or more processors, further cause:
  the server administration service, executing on the server computer, receiving from the administrative user of the client device via the one or more networks, a request to change an order of application services in a particular category of application services, from the plurality of categories of application services that are available for implementation by each vendor-administrative user, from a plurality of vendor-administrative users, on their respective plurality of MFPs, and
  the server administration service, in response to receiving from the administrative user of the client device via the one or more networks, the request to change an order of application services in a particular category of application services, from the plurality of categories of application services that are available for implementation by each vendor-administrative user, from a plurality of vendor-administrative users, on their respective plurality of MFPs:
    generating a modified particular category of application services that includes the changed order of application services included therein, and
    causing the modified particular category application services that includes the changed order of application services included therein, to be implemented on each MFP, from the respective plurality of MFPs for each vendor-administrative user, from the plurality of vendor-administrative users, that currently has the particular category of application services implemented thereon.

7. The apparatus of claim 6, wherein:
causing the modification to the particular application service to be implemented on each MFP, from the respective plurality of MFPs for each vendor-administrative user, from the plurality of vendor-administrative users, that has currently implemented thereon, a category of application services that includes the particular application service includes causing the modification to the particular application service to be implemented on each MFP, from the respective plurality of MFPs for each vendor-administrative user, from the plurality of vendor-administrative users, that a) has currently implemented thereon, a category of application services that includes the particular application service, and b) is currently registered with the server administration service.

8. One or more non-transitory computer-readable media for providing an improvement in modifying application services that are currently implemented on multi-function peripherals (MFPs), the one or more non-transitory computer-readable media storing instructions, which, when processed by one or more processors, cause:
  a server administration service executing on the server computer causing to be displayed on a client device, via one or more networks, a graphical user interface that is associated with a system administrator user and includes graphical user interface controls for displaying a category view and an application view,
    wherein the category view displays a plurality of categories of application services that are available for implementation by each vendor-administrative user, from a plurality of vendor-administrative users, on their respective plurality of MFPs,
    wherein the application view displays a plurality of application services that are available for assignment by each vendor-administrative user, from the plurality of vendor-administrative users, to categories of application services implemented on their respective plurality of MFPs,
  the server administration service, executing on the server computer, receiving from an administrative user of the client device via the one or more networks, a request to modify a particular application service from the plurality of application services that are available for assignment by each vendor-administrative user, from the plurality of vendor-administrative users, to the categories of application services implemented on their respective plurality of MFPs;
  the server administration service, in response to receiving from the administrative user of the client device via the one or more networks, the request to modify a particular application service from the plurality of application services that are available for assignment by each vendor-administrative user, from the plurality of vendor-administrative users, to the categories of application services implemented on their respective plurality of MFPs:
    determining one or more categories of application services that include the particular application service,
    determining one or more particular vendor-administrative users, from the plurality of vendor-administrative users, that currently have implemented the one or more categories of application services that include the particular application service, determining a plurality of MFPs that are associated with the one or more particular vendor-administrative users that currently have implemented the one or more categories of application services that include the particular application service, and causing the modification to the particular application service to be implemented on each MFP, from the determined plurality of MFPs that are associated with the one or more particular vendor-administrative users that currently have implemented the one or more categories of application services that include the particular application service.

9. The one or more non-transitory computer-readable media of claim 8, wherein the request to modify the particular application service from the plurality of application services that are available for assignment by each vendor-administrative user, from the plurality of vendor-administrative users, to the categories of application services implemented on their respective plurality of MFPs is a request to modify an attribute of the particular application service, disable the particular application service, or remove the particular application service.

10. The one or more non-transitory computer-readable media of claim 9, further comprising storing instructions, which, when processed by the one or more processors, cause:

the server administration service, executing on the server computer, receiving from the administrative user of the client device via the one or more networks, a request to modify a particular category of application services, from the plurality of categories of application services that are available for implementation by each vendor-administrative user, from a plurality of vendor-administrative users, on their respective plurality of MFPs, and the server administration service, in response to receiving from the administrative user of the client device via the one or more networks, the request to modify a particular category of application services from the plurality of categories of application services that are available for assignment by each vendor-administrative user, from the plurality of vendor-administrative users, to the categories of application services implemented on their respective plurality of MFPs:

generating a modified particular category of application services, and causing the modified particular category application services to be implemented on each MFP, from the respective plurality of MFPs for each vendor-administrative user, from the plurality of vendor-administrative users, that currently has the particular category of application services implemented thereon.

11. The one or more non-transitory computer-readable media of claim 10, wherein the request to modify a particular category of application services, from the plurality of categories of application services that are available for implementation by each vendor-administrative user, from a plurality of vendor-administrative users, on their respective plurality of MFPs is one or more of a request to add a new application service to the particular category of application services, a request to disable or remove a particular application service from the particular category of application services, a request to change an attribute of the particular category of application services, or a request to change an order of application services within the particular category of application services.

12. The one or more non-transitory computer-readable media of claim 10, further comprising additional instructions, which, when processed by the one or more processors, cause:

in response to causing the modified particular category application services to be implemented on each MFP, from the respective plurality of MFPs for each vendor-administrative user, from the plurality of vendor-administrative users, that currently has the particular category of application services implemented thereon, maintaining historical data for the particular category of application services.

13. The one or more non-transitory computer-readable media of claim 8, wherein the one or more memories storing instructions which, when processed by one or more processors, further cause:

the server administration service, executing on the server computer, receiving from the administrative user of the client device via the one or more networks, a request to change an order of application services in a particular category of application services, from the plurality of categories of application services that are available for implementation by each vendor-administrative user, from a plurality of vendor-administrative users, on their respective plurality of MFPs, and the server administration service, in response to receiving from the administrative user of the client device via the one or more networks, the request to change an order of application services in a particular category of application services, from the plurality of categories of application services that are available for implementation by each vendor-administrative user, from a plurality of vendor-administrative users, on their respective plurality of MFPs:

generating a modified particular category of application services that includes the changed order of application services included therein, and causing the modified particular category application services that includes the changed order of application services included therein, to be implemented on each MFP, from the respective plurality of MFPs for each vendor-administrative user, from the plurality of vendor-administrative users, that currently has the particular category of application services implemented thereon.

14. The one or more non-transitory computer-readable media of claim 13, wherein:

causing the modification to the particular application service to be implemented on each MFP, from the respective plurality of MFPs for each vendor-administrative user, from the plurality of vendor-administrative users, that has currently implemented thereon, a category of application services that includes the particular application service includes causing the modification to the particular application service to be implemented on each MFP, from the respective plurality of MFPs for each vendor-administrative user, from the plurality of vendor-administrative users, that a) has currently implemented thereon, a category of application services that includes the particular application service, and b) is currently registered with the server administration service.

15. A computer-implemented method for providing an improvement in modifying application services that are currently implemented on multi-function peripherals (MFPs), the apparatus comprising:
- a server administration service executing on the server computer causing to be displayed on a client device, via one or more networks, a graphical user interface that is associated with a system administrator user and includes graphical user interface controls for displaying a category view and an application view,
  - wherein the category view displays a plurality of categories of application services that are available for implementation by each vendor-administrative user, from a plurality of vendor-administrative users, on their respective plurality of MFPs,
  - wherein the application view displays a plurality of application services that are available for assignment by each vendor-administrative user, from the plurality of vendor-administrative users, to categories of application services implemented on their respective plurality of MFPs,
- the server administration service, executing on the server computer, receiving from an administrative user of the client device via the one or more networks, a request to modify a particular application service from the plurality of application services that are available for assignment by each vendor-administrative user, from the plurality of vendor-administrative users, to the categories of application services implemented on their respective plurality of MFPs;
- the server administration service, in response to receiving from the administrative user of the client device via the one or more networks, the request to modify a particular application service from the plurality of application services that are available for assignment by each vendor-administrative user, from the plurality of vendor-administrative users, to the categories of application services implemented on their respective plurality of MFPs:
  - determining one or more categories of application services that include the particular application service,
  - determining one or more particular vendor-administrative users, from the plurality of vendor-administrative users, that currently have implemented the one or more categories of application services that include the particular application service,
  - determining a plurality of WI's that are associated with the one or more particular vendor-administrative users that currently have implemented the one or more categories of application services that include the particular application service, and
  - causing the modification to the particular application service to be implemented on each MFP, from the determined plurality of MFPs that are associated with the one or more particular vendor-administrative users that currently have implemented the one or more categories of application services that include the particular application service.

16. The computer-implemented method of claim 15, wherein the request to modify the particular application service from the plurality of application services that are available for assignment by each vendor-administrative user, from the plurality of vendor-administrative users, to the categories of application services implemented on their respective plurality of WI's is a request to modify an attribute of the particular application service, disable the particular application service, or remove the particular application service.

17. The computer-implemented method of claim 16, further comprising:
- the server administration service, executing on the server computer, receiving from the administrative user of the client device via the one or more networks, a request to modify a particular category of application services, from the plurality of categories of application services that are available for implementation by each vendor-administrative user, from a plurality of vendor-administrative users, on their respective plurality of MFPs, and
- the server administration service, in response to receiving from the administrative user of the client device via the one or more networks, the request to modify a particular category of application services from the plurality of categories of application services that are available for assignment by each vendor-administrative user, from the plurality of vendor-administrative users, to the categories of application services implemented on their respective plurality of MFPs:
  - generating a modified particular category of application services, and
  - causing the modified particular category application services to be implemented on each MFP, from the respective plurality of MFPs for each vendor-administrative user, from the plurality of vendor-administrative users, that currently has the particular category of application services implemented thereon.

18. The computer-implemented method of claim 15, wherein the request to modify a particular category of application services, from the plurality of categories of application services that are available for implementation by each vendor-administrative user, from a plurality of vendor-administrative users, on their respective plurality of MFPs is one or more of a request to add a new application service to the particular category of application services, a request to disable or remove a particular application service from the particular category of application services, a request to change an attribute of the particular category of application services, or a request to change an order of application services within the particular category of application services.

19. The computer-implemented method of claim 15, further comprising in response to causing the modified particular category application services to be implemented on each MFP, from the respective plurality of MFPs for each vendor-administrative user, from the plurality of vendor-administrative users, that currently has the particular category of application services implemented thereon, maintaining historical data for the particular category of application services.

20. The computer-implemented method of claim 19, further comprising:
- the server administration service, executing on the server computer, receiving from the administrative user of the client device via the one or more networks, a request to change an order of application services in a particular category of application services, from the plurality of categories of application services that are available for implementation by each vendor-administrative user, from a plurality of vendor-administrative users, on their respective plurality of MFPs, and
- the server administration service, in response to receiving from the administrative user of the client device via the one or more networks, the request to change an order of application services in a particular category of application services, from the plurality of categories of application services that are available for implementation by each vendor-administrative user, from a plurality of vendor-administrative users, on their respective plurality of MFPs:
generating a modified particular category of application services that includes the changed order of application services included therein, and
causing the modified particular category application services that includes the changed order of application services included therein, to be implemented on each MFP, from the respective plurality of MFPs for each vendor-administrative user, from the plurality of vendor-administrative users, that currently has the particular category of application services implemented thereon.

* * * * *